(12) United States Patent
Schultz et al.

(10) Patent No.: US 7,155,491 B1
(45) Date of Patent: Dec. 26, 2006

(54) INDIRECT ADDRESS REWRITING

(75) Inventors: Dietrich W Schultz, Foster City, CA (US); Hal R Schectman, Portola Valley, CA (US); Judith A Hay, Mountain View, CA (US); Michael P Thompson, San Carlos, CA (US); Kevin G Wallace, San Francisco, CA (US); Steven R Kusmer, San Francisco, CA (US)

(73) Assignee: WebSideStory, Inc., San Diego, CA (US)

( * ) Notice: Subject to any disclaimer, the term of this patent is extended or adjusted under 35 U.S.C. 154(b) by 730 days.

(21) Appl. No.: 09/957,099

(22) Filed: Sep. 19, 2001

Related U.S. Application Data

(60) Provisional application No. 60/260,000, filed on Jan. 4, 2001, provisional application No. 60/248,303, filed on Nov. 13, 2000.

(51) Int. Cl.
G06F 15/167 (2006.01)
G06F 15/16 (2006.01)

(52) U.S. Cl. .................. 709/217; 709/203; 709/245

(58) Field of Classification Search ........... 709/202, 709/203, 219, 234, 238, 240, 242, 208, 210, 709/212, 217, 220, 221, 227, 228, 218, 239, 709/245; 707/2, 3, 4, 5
See application file for complete search history.

(56) References Cited

U.S. PATENT DOCUMENTS

| | | | | |
|---|---|---|---|---|
| 5,659,729 A | * | 8/1997 | Nielsen | 707/3 |
| 5,659,732 A | * | 8/1997 | Kirsch | 707/5 |
| 5,907,680 A | * | 5/1999 | Nielsen | 709/228 |
| 5,958,008 A | * | 9/1999 | Pogrebisky et al. | 709/223 |
| 5,983,245 A | | 11/1999 | Newman et al. | |
| 6,009,459 A | * | 12/1999 | Belfiore et al. | 709/203 |
| 6,052,730 A | * | 4/2000 | Felciano et al. | 709/225 |
| 6,088,710 A | | 7/2000 | Dreyer et al. | |
| 6,134,552 A | | 10/2000 | Fritz et al. | |
| 6,141,666 A | | 10/2000 | Tobin | |
| 6,185,587 B1 | | 2/2001 | Bernardo et al. | |
| 6,219,680 B1 | | 4/2001 | Bernardo et al. | |
| 6,247,032 B1 | | 6/2001 | Bernardo et al. | |
| 6,272,505 B1 | * | 8/2001 | De La Huerga | 715/501.1 |
| 6,304,886 B1 | | 10/2001 | Bernardo et al. | |
| 6,308,188 B1 | | 10/2001 | Bernardo et al. | |
| 6,397,210 B1 | * | 5/2002 | Stern et al. | 707/3 |
| 6,549,944 B1 | * | 4/2003 | Weinberg et al. | 709/224 |
| 6,658,402 B1 | * | 12/2003 | Dutta | 707/2 |
| 6,684,369 B1 | | 1/2004 | Bernardo et al. | |

(Continued)

OTHER PUBLICATIONS

Microsoft Corporation, "Saving Web Pages, Offline Viewing," Microsoft Internel Explorer Help page [retrieved on Oct. 30, 2002], 1 page.

(Continued)

*Primary Examiner*—Ario Etienne
*Assistant Examiner*—Sargon N. Nano
(74) *Attorney, Agent, or Firm*—Pattric J. Rawlins; Procopio Cory Hargreaves & Savitch LLP

(57) ABSTRACT

A system and method for modifying indirect addresses in a document. The indirect address is modified based on the type of indirect address, the context in which the document is viewed, and the user interface used to view the document.

4 Claims, 17 Drawing Sheets

U.S. PATENT DOCUMENTS

| | | |
|---|---|---|
| 6,725,428 B1 | 4/2004 | Pareschi et al. |
| 6,742,163 B1 | 5/2004 | Ono et al. |
| 6,772,393 B1 | 8/2004 | Estrada et al. |
| 6,820,235 B1 | 11/2004 | Bleicher et al. |

OTHER PUBLICATIONS

Adobe Systems Incorporated, "Converting Web Pages to PDF," Adobe Acrobat 4.0 Guide [online], [retrieved on Oct. 30, 2002], pp. 202-207.

"MSN Hotmail" [online]. Microsoft Corporation, 2002 [retrieved on Oct. 30, 2002]. Retrieved from the Internet: <URL:http://lw4fd.law4.hotmail.msn.com/cgi-bin/premail/2195>.

Macromedia, Inc., Dreamweaver User Manual, pp. 51-60, Dec. 1999.

Macromedia, Inc., Dreamweaver User Manual, pp. 109-175, Dec. 1999.

Macromedia, Inc., Dreamweaver User Manual, pp. 355-376, Dec. 1999.

\* cited by examiner

INDIRECT ADDRESS REWRITING

This application claims priority under 35 U.S.C. §119(e) from U.S. Patent Application Ser. No. 60/248,303, filed Nov. 13, 2000, entitled, "Web Site Publishing System And Method," which is incorporated by reference in its entirety. This application also claims priority under 35 U.S.C. §119 (e) from U.S. Patent Application Ser. No. 60/260,000, filed Jan. 4, 2001, entitled, "URL Rewriting System And Method," which is incorporated by reference in its entirety.

BACKGROUND

1. Field of the Invention

This invention relates to information systems and, more particularly, to a system and method for rewriting indirect addresses.

2. Background of the Invention

Many individuals and organizations have web sites comprising large numbers of web pages. These web sites are created and periodically changed, modified, or updated. It is desirable to provide an Internet-based web publishing system and method that simplifies the creation and editing of web sites. In such a web publishing system, the locations of some web pages can change in relation to one another as pages are created, edited, previewed, published, and maintained. For example, a web page may be in one location during editing, then moved to another location for normal use and viewing of that web page. System maintenance may require that web pages be moved from server to server. Certain uniform resource locators ("URL"s) within the web pages do not function correctly if the location of the web pages containing the URL changes.

The example of a site relative URL illustrates why certain URLs do not work correctly when the web page containing the URL changes. Web sites commonly employ site relative URLs to link content together on a web site. Site relative URLs specify a location relative to the current server. Since the current server may change when the location of the web page changes, the web page will not function correctly if the site relative URL does not change.

For example, assume the web page "doc.html" is being edited within a web publishing system at the absolute URL location of "http://www.editing.com/files/doc.html". The site relative URL "/images/logo.gif" is used to reference a graphic within "doc.html". The image "logo.gif" exists only on the destination web site at "http://www.random.com/images/logo.gif", which is external to the web publishing system. When the web page is stored on the destination web site, the site relative URL will function correctly. However, if the web page is stored on the web publishing system, the browser previewing the edited content of "doc.html" will improperly resolve the site relative URL to "http://www.editing.com/images/logo.gif." Since "logo.gif" does not exist at this location, the preview of the web page fails. Similar issues occur when web pages are published to a staging server for testing and quality assurance purposes.

Therefore, there is a need for a method and system to automatically modify URLs so that the URLs of web pages work correctly in a web publishing or similar system.

SUMMARY OF THE INVENTION

One embodiment of the present invention is a method to modify indirect addresses, such as URLs, in a document, such as a web page, so that the indirect addresses correctly reference their target when the document is at different locations. A document template and content are stored separately. In order to view the document, the template and content are combined to form the document. The template or content of the document includes at least one indirect address. There are different contexts in which to view the document. There are multiple user interfaces, and the document is presented differently in each user interface. There are also several different types of indirect addresses. The context, user interface, and type of the indirect address determines whether and how the indirect address is modified so that the document is presented to the user correctly and functions correctly. When the document is to be viewed, the context, user interface, and type of indirect address are determined. Based on these factors, the indirect address is correctly modified.

In another embodiment, a system generates a document from a template and a content file. The system includes a user interface module, a template module, a content module, and a document module. When the user interface module receives a request for the document from a client device, the template module sends a template to the document module and the content module sends a content file to the document module. At least one of the template or content file contains an indirect address. The document module determines whether and how to modify the indirect address. The document then combines the template, the content file, and the indirect address to generate the document.

DETAILED DESCRIPTION OF THE PREFERRED EMBODIMENTS

Figure 1A:
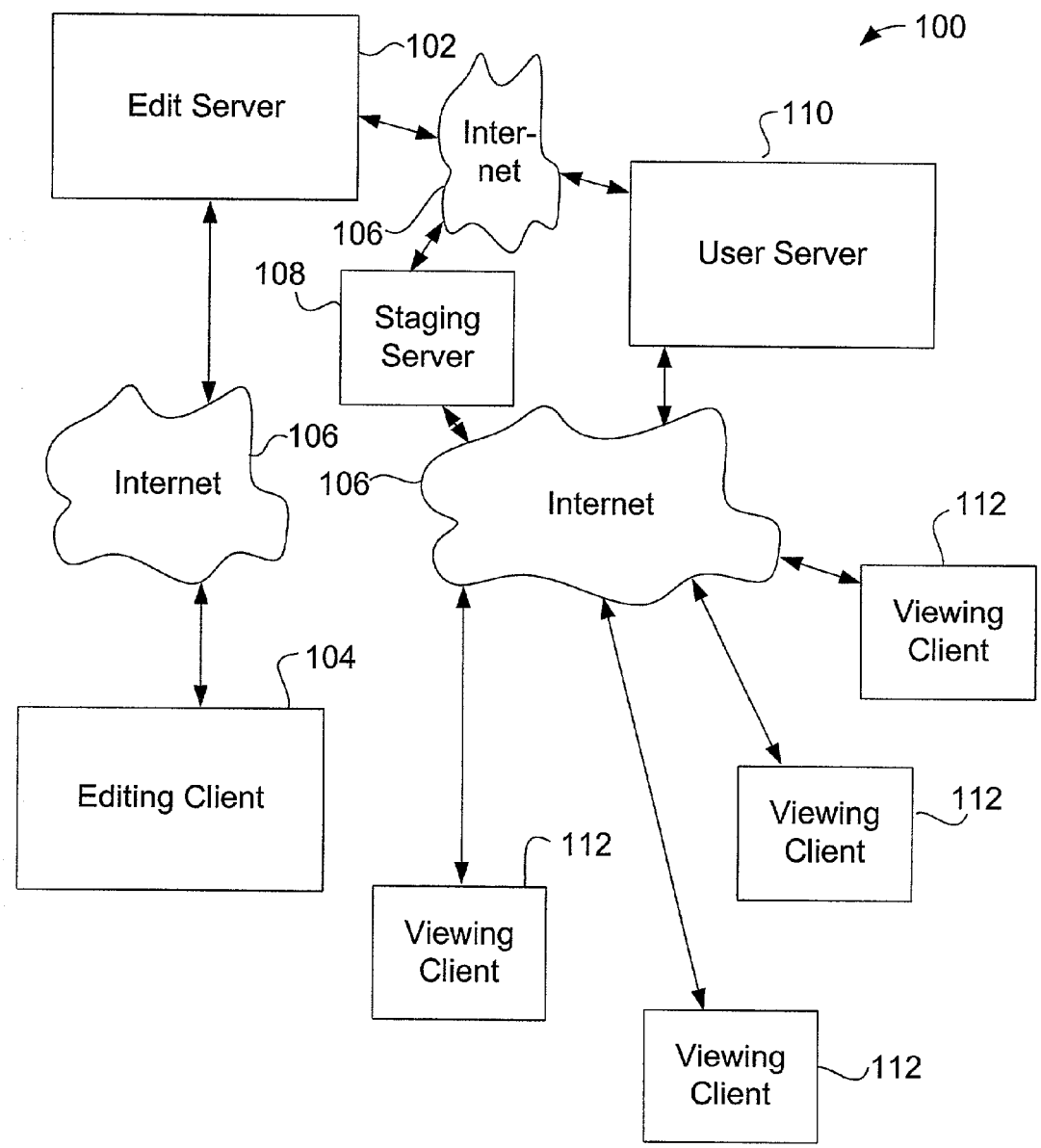
FIG. 1(a) is a block diagram of a web publishing system that automatically rewrites URLs.

Introduction:

A document, such as a web page on the Internet, can be moved between several different locations. In the case of a web page, the web page can be located on the server where it is created, edited and maintained, and then moved to another server where it is viewed during normal use. As the web page moves, the address of the web page changes. Web pages contain indirect addresses, such as URLs, that refer to other documents and files. Some of these addresses indicate a location relative to the location of the web page on which the address is located. If the web page moves and the relative address does not change, the relative address will not function correctly. The present invention modifies indirect addresses in documents, such as URLs in web pages, as the location of the document changes so that the indirect addresses continue to function correctly. In the described embodiment, the indirect addresses are URLs, the documents are web pages on the Internet. However, the invention is not limited to such an application, and also applies to other types of documents with other indirect addresses and on other networks.

Definitions:

Definitions of various selected terms are listed below.

URL: Stands for "Uniform Resource Locator." The URL defines the location of a file. The URL is a type of indirect address, and refers to the direct, numerical IP address.

Absolute URL: A URL that includes the complete scheme and server. Example: http://www.atomz.com/images/logo.gif. An absolute URL is not relative to the location of the document that contains the URL.

Site relative URL: A URL that specifies a location relative to the current server. Example: /images/logo.gif.

Document relative URL: A URL that specifies a location relative to the document in which the URL appears. Often, but not always, document relative URLs start with two dots and a slash ("../"). Example: ../logo.gif.

Template relative URL: A URL within a template file that specifies a location relative to the template file in the web publishing system. A template relative URL is a type of document relative URL.

Page relative URL: A URL that specifies a location relative to a merged page in the web publishing system. A page relative URL is a type of document relative URL, and is identified as a page relative URL by a marking code.

System relative URL: A URL that specifies a location relative to the site base that will contain the web page. A system relative URL is a type of document relative URL, and is identified as a system relative URL by a marking code.

Same page link URL: A URL that specifies a location on the same web page that contains the same page link URL.

Template: A document that provides a general look and feel for web pages based on that template. The template includes defined sections for adding content. Generally, the document is written in hypertext markup language ("HTML"), or an extended HTML.

Content: Data that provides information for a particular instance of a template. Content is combined with a template to form a web page. Typically, multiple content files exist related to the same template, such that each content file is combined with the template to form a separate web page based on that template.

Publish: Combining the template with content files to create the web pages, and placing the web pages on the user server for normal use.

Stage: Combining the template with content files to create the web pages, and placing the web pages on the staging server to allow review of the web pages before sending them to the user server.

Template preview: In a template preview, the user sees the template as it would look as part of a web page.

Page preview: In a page preview, the user sees a web page as it would look on the staging server or user server. A template and content are combined in a page preview.

Local publish/local stage: A publish or stage, where the user server or staging server is part of the edit server, instead of a separate physical server. Certain URLs usually are modified when the templates and content files are combined for staging or publishing.

External publish/external stage: A publish or stage, where the user server or staging server is a separate server, instead of part of the edit server. Certain URLs usually are modified when the templates and content files are combined for staging or publishing.

Site base: The root of the client's web site, which will contain the web pages if the web pages are published externally. Example: http://www.client.com.

Internal URL: A URL that references a file that is one of the files managed by the web publishing system.

External URL: A URL that references a file that is not one of the files managed by the web publishing system.

Internal web page: A web page managed by the web publishing system. The internal web pages are created or edited by the web publishing system.

External web page: A web page not managed by the web publishing system. While the web publishing system does not create or edit external web pages, external web pages may be referenced by URLs of internal web pages.

Web Publishing System:

FIG. 1(a) is a block diagram of a web publishing system 100 that allows a user to easily create and edit web pages that make up all or part of a web site. As the web pages move from one location to another, the web publishing system 100 automatically modifies URLs to function correctly. The system 100 includes an edit server 102. The edit server 102 stores web page template data, content data, and software and/or hardware instructions used to edit the web site. The edit server 102 also provides a user interface to the editing client 104 to allow the user to create and maintain the web site. The edit server 102 can be one server computer unit, or distributed over multiple computers.

The edit server 102 is connected to an editing client 104 via a network such as the Internet 106. When a user wishes to edit the web site, the user uses an editing client 104, preferably a personal computer with a web browser, to access the edit server 102. The edit server 102 provides functionality to allow a user on an editing client 104 to access editing tools and a current, edited copy of the template and content files that comprise the web site. Preferably, the edit server 102 does this by sending information to the editing client 104 that is interpreted and displayed on the web browser of the editing client 104 and receiving user instructions from the editing client 104.

The edit server 102 stores the edited, updated version of the web site. However, this edited version is not available for general viewing until the changes are sent to the user server 110 where the actual web site resides for general use. The user server 110 can be a separate physical server, or can be a part of the edit server 102. The user server 110 can also be one server unit, or distributed over multiple computers.

Additionally, the web publishing system 100 includes a staging server 108. The staging server 108 allows the user to preview the web site after editing and before the web site is sent to the user server 110 for general use. The staging server 108 can be a separate physical server, part of the user server 110, or part of the edit server 102. The staging server 108 can also be one server unit, or distributed over multiple computers. Staging is an optional step between editing the web site and publishing the web site.

The user server 110 is connected to the edit server 102. In one embodiment, the user server 110 is connected to the edit server 102 via the Internet 106. However, other networks besides the Internet could also be used. The edit server 102, or alternatively the staging server 108, sends the web pages to the user server 110. The edit server 102 can send a single page, multiple pages, all pages that have been updated, or the whole web site to the user server 110 so that the user server 110 contains the most recent edition of the web site.

From the user server 110, the site is available to those who wish to view the pages. A plurality of viewing clients 112 may be connected to the user server 110 via the Internet 106. Viewing clients 112 view the web pages stored on the user server 110 via the Internet 106.

Figure 1B:
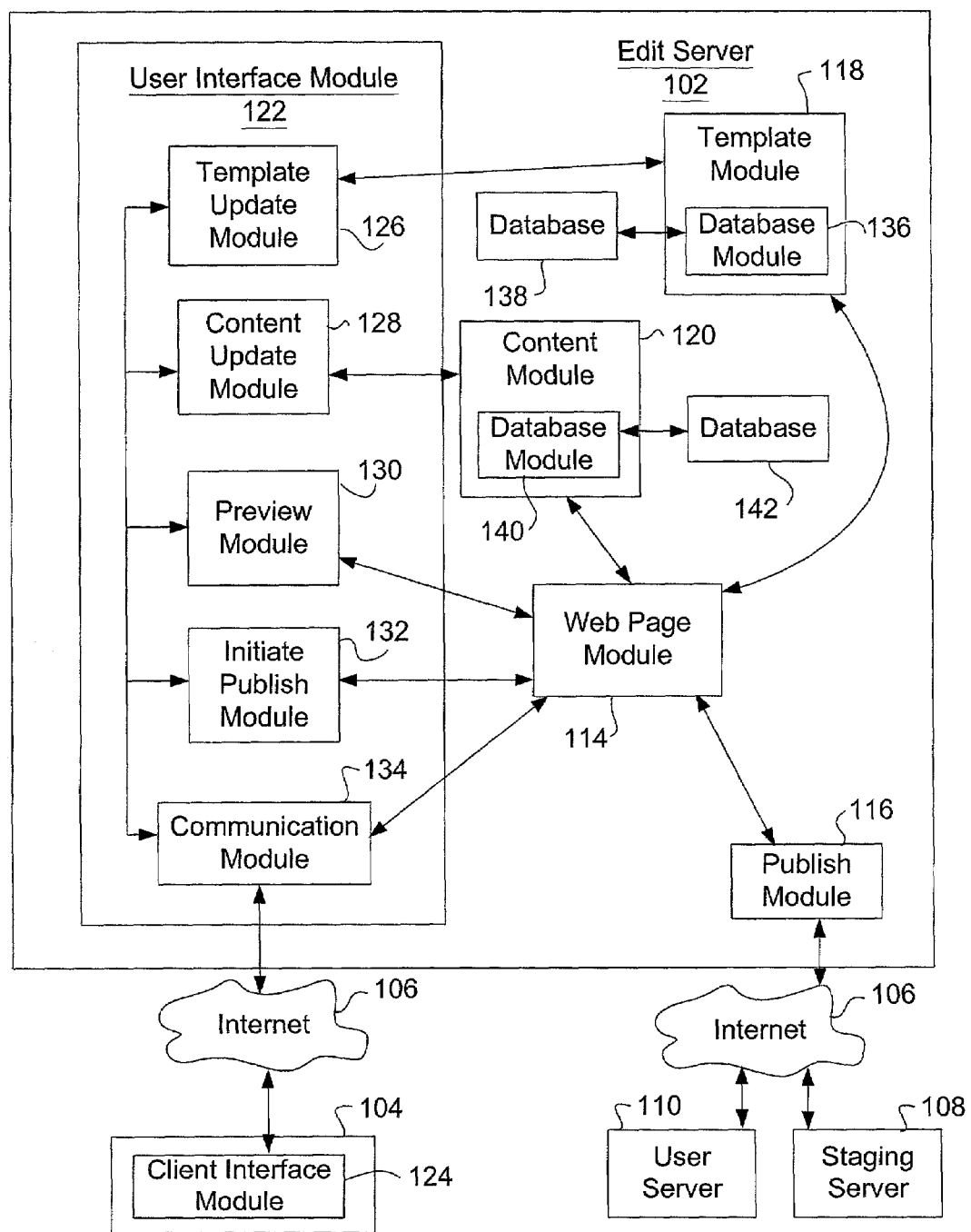
FIG. 1(b) is a block diagram showing more detail of the edit server and the editing client.

FIG. 1(*b*) is a block diagram showing more detail of the edit server 102 and the editing client 104. The edit server 102 includes a web page module 114, a publish module 116, a template module 118, a content module 120, and a user interface module 122. The user interface module 122 includes a template update module 126, a content update module 128, a preview module 130, an initiate publish module 132, and a communication module 134. The content module 120 includes a database module 140, which is connected to a database 142. The template module 118 also includes a database module 136, which is connected to a database 138. While the databases 138 and 142 are shown as being within the edit server 102, the databases 138 and 142 may also be located elsewhere. The editing client 104 includes a client interface module 124. The modules can be implemented in software, hardware, or firmware.

The user interface module 122 provides a user interface to the user via the client interface module 124 on the editing client 104. Preferably, the client interface module 124 is a web browser. The communication module 134 of the user interface module 122 sends HTML data to the client interface module 124. The HTML data is interpreted and displayed by the client interface module 124 to provide a user interface for the user. This user interface provides information to the user and allows the user to enter and send information to the edit server 102.

The user enters information defining or editing templates into the client interface module 124 of the editing client 104. The client interface module 124 displays a field into which the user may enter HTML code that defines the template. After the user enters the code, the client interface module 124 sends the code to the communication module 134 via the Internet 106. The communication module 134 directs the code to the template update module 126, which in turn sends the code to the template module 118. The template module 118 manages the templates in the database 138. If the template is a new template, the template module 118 stores the code in a database 138, via a database module 136. If the template is an edited version of a template that already exists, the template module 118 updates the template stored in the database 138, via the database module 136.

The user also enters information defining web page content into the client interface module 124. The client interface module 124 displays a field into which the user enters the content. After the user enters the content, the client interface module 124 sends the code to the communication module 134 via the Internet 106. The communication module 134 directs the code to the content update module 128, which in turn sends the code to the content module 120. The content module 120 manages the content files in the database 142 via the database module 140. If the received content is an edited update of existing content, the content module 120 updates the existing content in the database 142.

When the user desires to view a web page while using the editing client 104, the user sends a request to the user interface module 122 via the client interface module 124 and the Internet 106. The user interface module 122 receives the request at the communication module 134, which sends the request to the preview module 130. The preview module 130 then sends a request to the web page module 114. The web page module 114 is a type of document module that handles web page documents. In other embodiments with other document types, the web page module 114 may be replaced with a document module specific to the type of document used. The web page module 114 retrieves the web page from cache or generates the web page by combining a template from the template module 118 and content from the content module 120 and delivers the web page to the preview module 130, which sends the web page to the communication module 134, which in turn passes the web page to the client interface module 124 for the user to view.

When the user desires to view the current version of the web site on either the staging server 108 or the user server 110, the user sends a request to the user interface module 122 via the client interface module 124 and the Internet 106. The user interface module 122 receives the request at the communication module 134, which sends the request to the initiate publish module 132. The initiate publish module 132 then sends the request to the web page module 114. The web page module 114 delivers the web page to the publish module 116, which in turn passes the web page to either the staging server 108 or the user server 110, depending on the user's request.

To deliver a web page to the preview module 130 or the publish module 116, the web page module 114 combines a template from the template module 118 and content from the content module 120. Alternatively, the template and content are retrieved from cache. When a template and content are merged to form a web page, that web page is cached. If neither the template nor the content has been changed since the last time the template and content were merged to form the web page, the merged web page is retrieved from cache instead of combined again. When a new or edited template or content file is sent to the template module 118 or content module 120, the template module 118 or content module 120 notifies the web page module 114 so that the web page module 114 is able to track whether the web page may be retrieved from cache, or should be created from combining template and content.

Typically, the template and content each contain URLs. The web page that the web page module 114 forms from the combination of the template and content also contains URLs. The web page may be at a different location than the template and content. In order for the URLs in the web page to function correctly, the web page module 114 modifies the URLs in the web page. The manner in which URLs are modified depends on whether the web page will be sent to the client interface module 124, the user server 110, or the staging server 108. After combining the template and content, the web page module 114 sends the web page with modified URLs to the publish module 116, to be sent to the user server 110 or the staging server 108, or to the preview module 130, to be sent to the client interface module 124.

Figure 2:
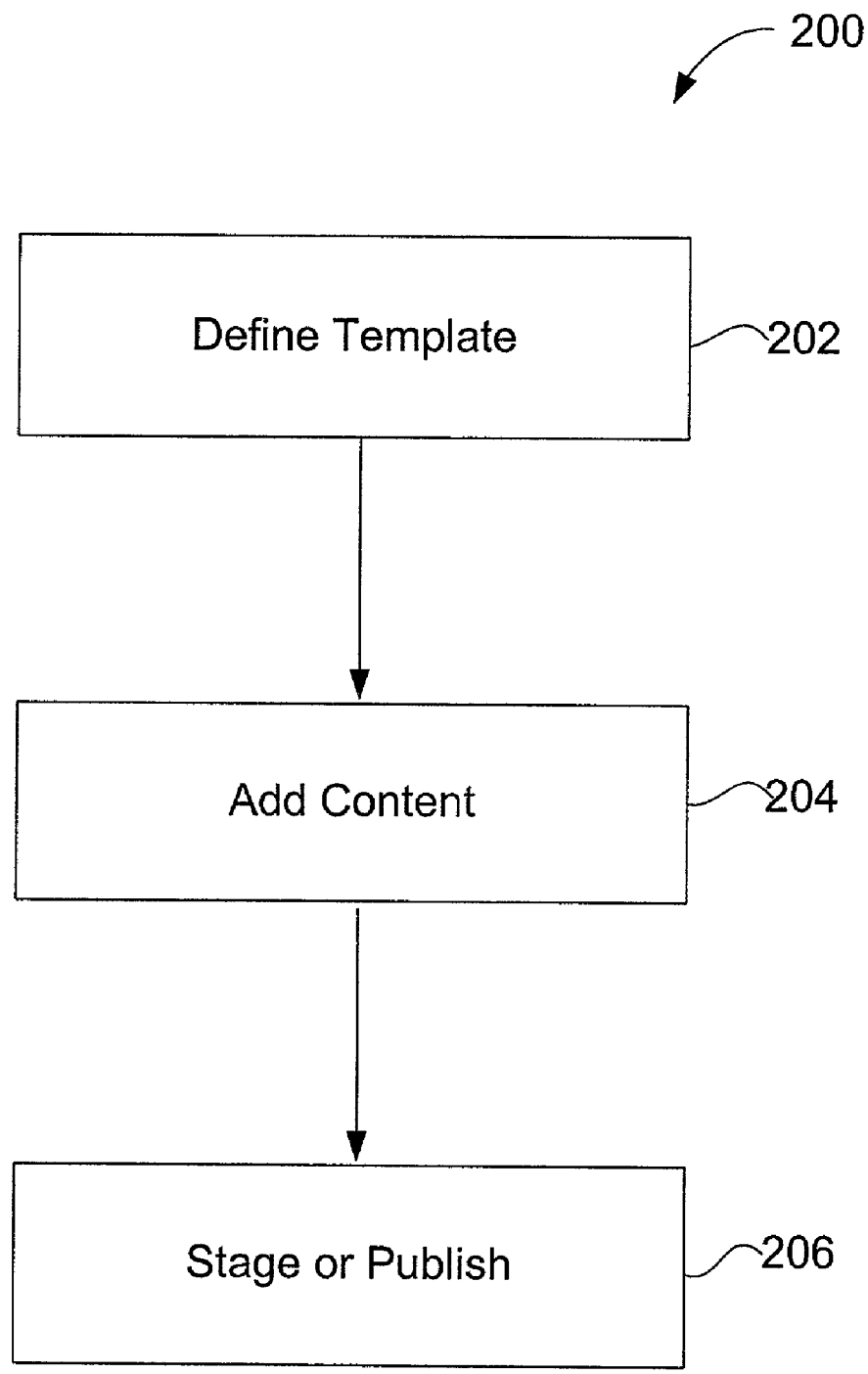
FIG. 2 is a flow chart showing how the user creates, edits and maintains the web site.

Web Page Creation and Editing Overview:

FIG. 2 is a flow chart 200 showing a summary overview of how the user creates, edits and maintains the web site. The user first creates 202 a template. The template is a file that defines a general look and feel for web pages based off that template. This simplifies the creation of web sites comprised of multiple web pages with a same general look and feel. The user interface module 122 provides an interface to the client interface module 124 to allow the user to create the template. After creation of the template, one or more web pages will be created from that template.

The template defines aspects of appearance and function that will appear in every web page based on that template. However, web pages based on the template also have aspects that differ from web page to web page. The content provides the aspects of a web page that are different from the other web pages based on the template. When creating the template, the user defines what aspects will differ in web pages based on the template. The user defines where content can be inserted, and what kind of content can be inserted in web pages based on the template. The use of templates makes it easy to ensure a uniform look and feel across a web site because the template defines much of each page based on it.

The user preferably creates the template using HTML code. Special tags define such things as what items are editable when creating pages based on the template and what items remain constant for all pages based on the template, and also has special marking codes for certain URL types. The tags used to create the template in one embodiment are found in Appendix I. The special tags are intermixed with industry standard HTML in the template. The combination of special tags and HTML coding defines the visual characteristics of the template and the associated content. The user can hand-code the HTML, or can use one of any number of commercial products that allow a user to easily define the look of a page and automatically generate the actual markup language code. The user may have to add the special tags to the code generated by the commercial product, if the commercial product only generates standard HTML code. Alternatively, the commercial products themselves may include functionality to add the special tags automatically. In one embodiment, if a commercial product generates the HTML code, the user then cuts and pastes the code into the template. Alternatively, the commercial product interfaces with the template module 118 and directly stores the generated code in the template file. After the user creates the template, the template is stored in the template module 118. The user may preview the template while editing to check that the user has coded the template correctly.

After the template has been created, the user adds 204 content to create web pages based on that template. During the creation of the template, the user utilized special tags to define editable sections of the template. These editable sections of the template define the locations and types of content that may be entered. When creating the web pages, the editable sections of the template are marked. The user then enters content for insertion into the editable sections.

Little to no knowledge of HTML is needed when entering content. The user interface provided to the editing client 104 when creating web pages shows the template with symbols marking sections that the user can edit. The user selects a symbol and is presented with an area in which to enter the content along with prompts as to what content to enter. The user types in the text or other information that the user desires to be included as content in that page. The content entered is stored in a content file associated with the template. By selecting the edit symbols and entering the information, the user adds the content that differentiates a particular web page from other web pages based on the template.

The user can use the same template and enter different sets of content to create several different web pages based on that template. On the edit server 102, the content, which includes only the information the user has entered that is relevant to a single web page, is stored separately from the template as a content file. This content file contains the raw data (such as ASCII text) representative of what the user entered into the editable sections of a template. The combination of content and template makes up the actual web page. Thus, if several web pages are based on a single template, multiple content files related to that template are created and stored. To generate the actual web pages, the each content file is merged with the related template file.

The content differentiates each web page based on a particular template, but the overall look and feel of all the web pages based on that template remains the same. For example, there could be a template for a company's products. This template includes the company's logo and links to other pages as aspects common to all web pages based on the template. The template further includes an area for a product name and an area for a product description as the editable sections, the aspects than can change for each web page based on the template. Thus, when the user enters content, the user simply types in the product name and the product description. Each time the user enters and saves another content file containing the product name and description, the user is, in effect, creating another web page. Each page includes both the aspects common to all web pages, provided by the template, and the aspects specific to that particular web page, provided by the content. The end result is several different pages for the several different products, each of the pages being uniform except for the information specific to that product.

Once the user has created or changed the web pages, the new or updated web pages are "staged" or "published" by sending 206 the web pages to the staging server 108 or the user server 110. "Staging" means that the templates are merged with the content files to form the web pages, and the web pages are placed on the staging server 108 so that the user can review the entire site before sending the site to the user server 110. As stated previously, the staging server 108 can be a separate physical server, a portion of the physical edit server 102, or a portion of the physical user server 110. The addresses of web pages on the staging server 108 are different than the locations of the web pages on the edit server 102 or the user server 110.

"Publishing" means that the templates are merged with the content files to form the web pages, and the web pages are placed on the user server 110 for normal use. As stated previously, the user server 110 can be a separate physical server or a portion of the edit server 102. Whether on a separate physical server, or on a portion of the edit server, the addresses of the web pages after publishing are different than the locations of the web pages on the edit server 102 or the staging server 108.

A web page can be located at several different addresses. The web page can be on the edit server 102 where it is viewed using the user interface, on a local staging server 108 or local user server 110, or on an external staging server 108 or external user server 110. If the web pages are being edited, or the staging server 108 or user server 110 are a portion of the edit server 102, their address will be defined in part by the location of the edit server 102 as well as the web page's location within the edit server 102. If the web page is published to a separate staging or user server, the web page's address will be defined by the address of the staging or user server and the location of the web page within the staging or user server. Thus, the URLs are modified so that they function correctly when the web page containing the URLs are in each of the separate addresses.

Preferably, if the web pages are published to a user server 110 that is a separate physical server, the user has defined a "site base" for the web pages managed by the web publishing system 100. The site base is the root of the client's web site. For example, a client may have a web site with a root of, "http://www.client.com." This root, "http://www.client.com," would be the site base. In this example, a web page called "page.html" created by the web publishing system 100 and not being defined as within another directory would be located at "http://www.client.com/page.html" after publishing. If, during editing, a page "product1.html" were defined as being within the directory "products," the page would be located at "http://www.user.com/products/product1.html." Thus, this site base defines at least part of the web pages' eventual address.

Figure 3A:
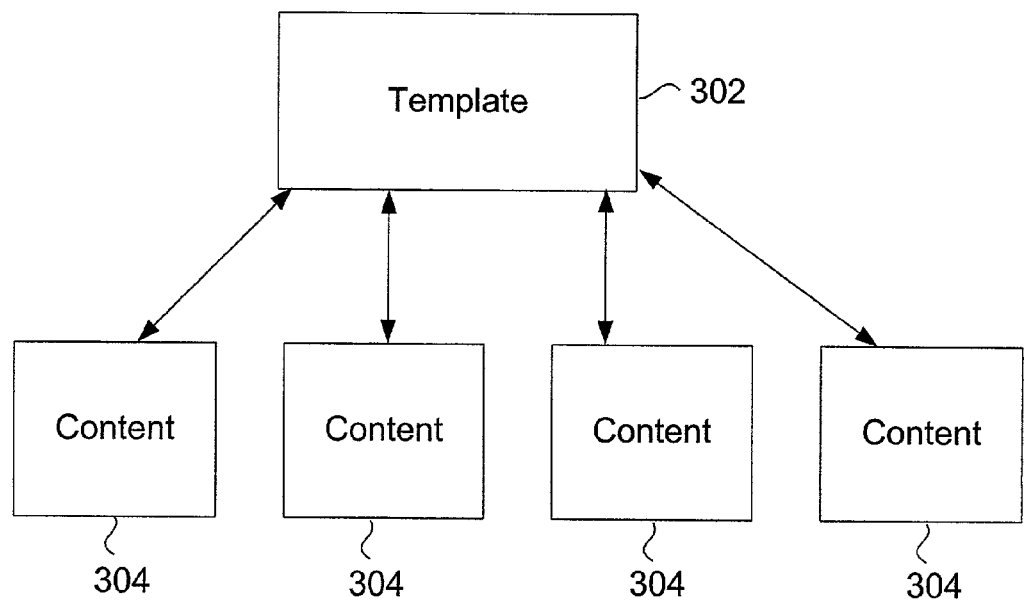
FIG. 3(a) is a block diagram of how the templates and web pages are stored on the edit server.
Figure 3B:
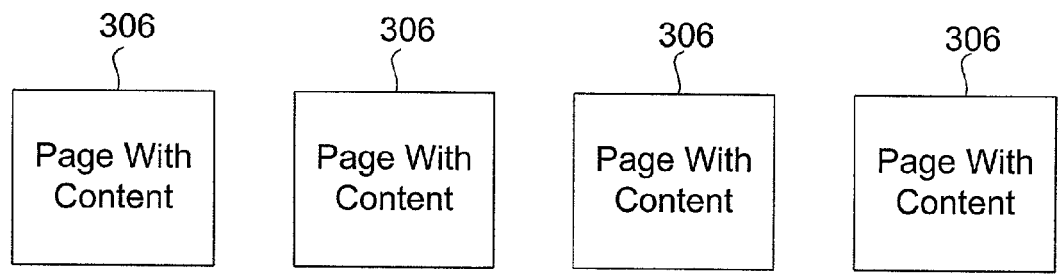
FIG. 3(b) is a block diagram of how the web pages are stored on the user server.

Templates and Content Files:

FIGS. 3(a) and 3(b) detail how the web page information is stored before and after staging or publishing.

FIG. 3(a) is a block diagram illustrating how the templates and content files are stored on the edit server 102 prior to viewing on the editing client 104, staging, or publishing. On the edit server 102, the template file 302 is stored separately from the content file 304. The template file is preferably an HTML document. When the user creates or edits the template file, the communication module 134 receives the created or edited template from the client interface module 124 and sends the template to the template update module 126. The template update module 126 sends the template to the template module 118, where the template is either stored as a new template or, in the case of an edited template, a previously stored template is changed. The template module 118 also informs the web page module 114 when a template is edited. This alerts the web page module 114 to not use the cached version of web pages based on that template, since the cached version is out of date. Instead, when the web page module 114 receives a request for a web page based on that template, the web page module 114 will retrieve the template from the template module 118 and the content from the content module 120 and combine them to form the web page.

Each content file 304 contains the data added by the user to define a particular web page based on a template. As stated previously, as the user creates the template, the user defines where content information will be added. When the user creates or edits a content file, the communication module 134 receives the created or edited content from the client interface module 124 and sends the content, which in one embodiment is an ASCII text file, to the content update module 128. The content update module 128 sends the content to the content module 120, where the content is either stored as a new content file in the database 142 or, in the case of editing, a previously stored content file in the database 142 is changed. Additional information is stored to link each content file 304 with the proper template file 302. The content module 120 also informs the web page module 114 when a content file is edited. This alerts the web page module 114 to not use the cached version of the web page that includes that content, since the cached version is out of date. Instead, when the web page module 114 receives a request for the web page including that content file, the web page module 114 will retrieve the content file from the content module 120 and the template from the template module 118 and combine them to form the web page.

By storing template file 302 separately from content files 304, the template can be modified once and, when the web page module 114 generates the web pages by combining the template and content files, the changes will affect every web page based on that template file 302.

FIG. 3(b) is a block diagram of the web pages when viewed, staged, or published. To initially form the web page 306, the web page module 114 merges a content file 304 from the content module 120 with a template file 302 from the template module 118 to form the web page 306. The web page module 114 modifies URLs as the web page module 114 forms the web page 306. The web page nodule 114 modifies URLs differently based on whether the request came from the preview module 130 or the initiate publish module 132, and also on how the web page 306 will be viewed. As stated previously, when the web page module 114 forms the web page 306, the web page 306 is stored in cache. This allows the web page module 114 to later retrieve the web page 306 from cache. This provides greater efficiency than combining the template and content each time the web page is viewed, staged or published.

When the preview module 130 or the initiate publish module 132 requests the web page 306, the web page module 114 determines whether the web page 306 is stored in cache. If the web page is stored in cache, and no changes have been made to the content file 304 and the template file 302 that formed the web page 306, the web page module 114 retrieves the web page 306 from cache. However, if either the content file 304 or the template file 302 is changed, the content module 120 or the template module 118 notifies the web page module 114 so that the web page module 114 will not retrieve the web page based on that content file 304 or template file 302 from cache. Instead, the web page module 114 combines the template file 302 and content file 304 again. The web page 306 is then viewed through the client interface module 124, sent to the staging server 108, or sent to the user server 110.

Detail of Creating and Editing Web Pages:

FIGS. 4(a) through 4(h) are screen shots detailing how a user performs operations with the web publishing system 100, and illustrating how the web publishing system modifies URLs. The user interacts with the web publishing system 100 through two user interfaces ("UI"s), the design UI and the task UI. The user creates templates and content files, edits templates and content files, and performs other actions on the web site by using one of the two user interfaces.

FIGS. 4(a) through 4(f) show the design UI. The design UI allows the user the ability to use any of the web publishing system's tools and functions. These functions include creating, previewing, testing, and editing templates, creating and editing content files, and creating, previewing, testing, and editing pages. Because the design UI gives the user full access to all functions, it is normally be reserved for users such as web administrators and web designers.

Figure 4A:
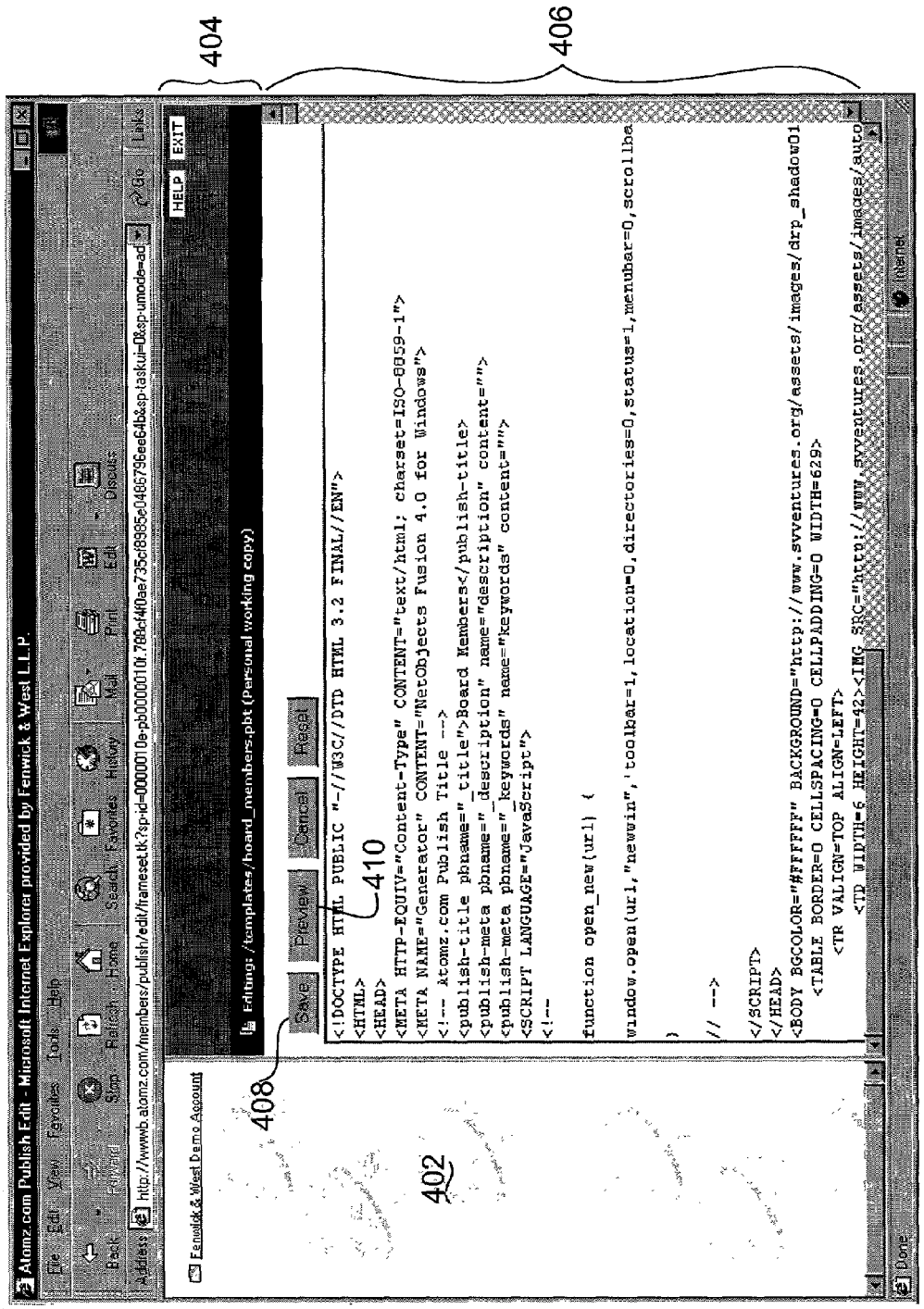
FIG. 4(a) is a screenshot showing the step of defining a template in more detail.
Figure 4B:
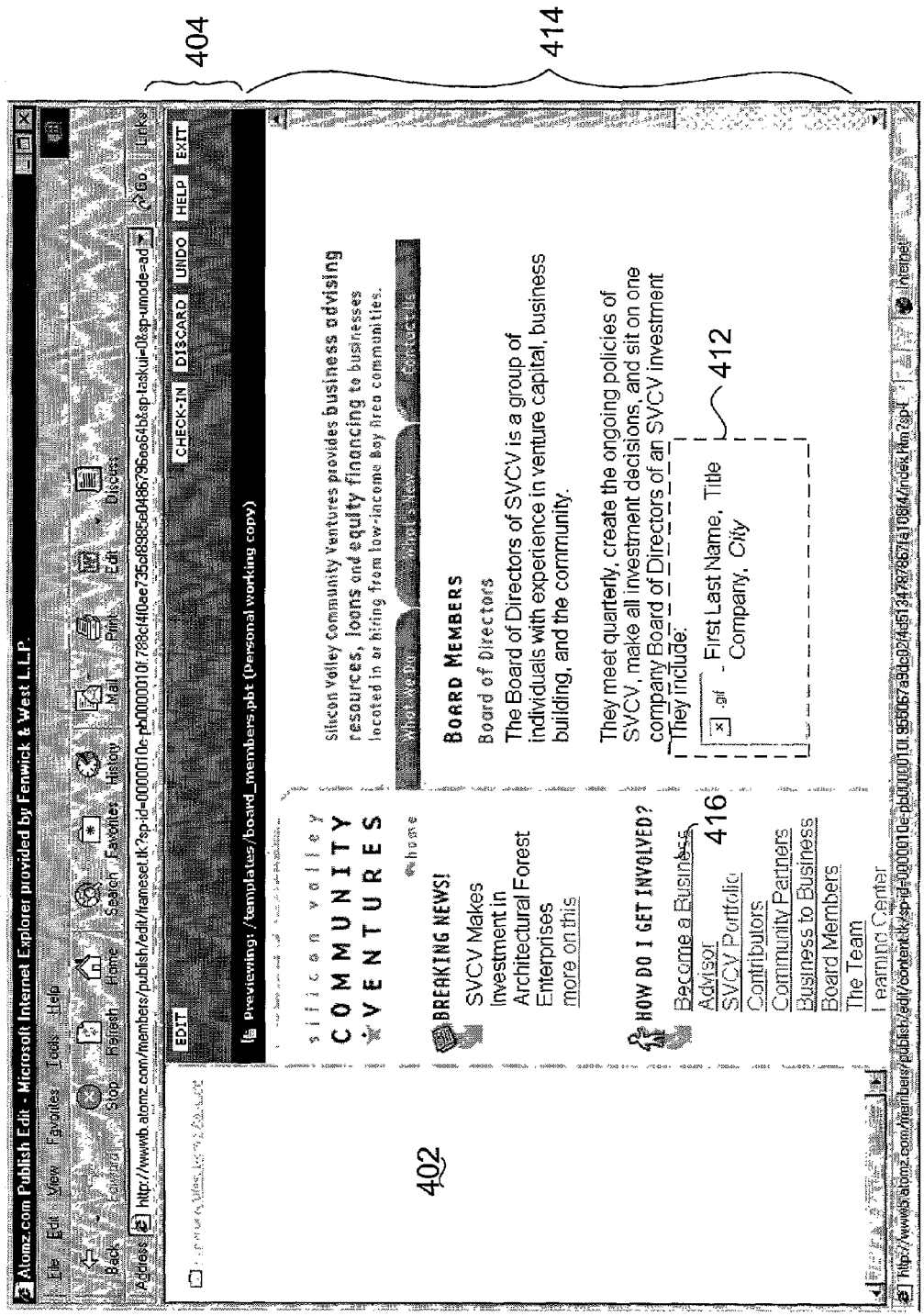
FIG. 4(b) is a screenshot showing a template preview.
Figure 4C:
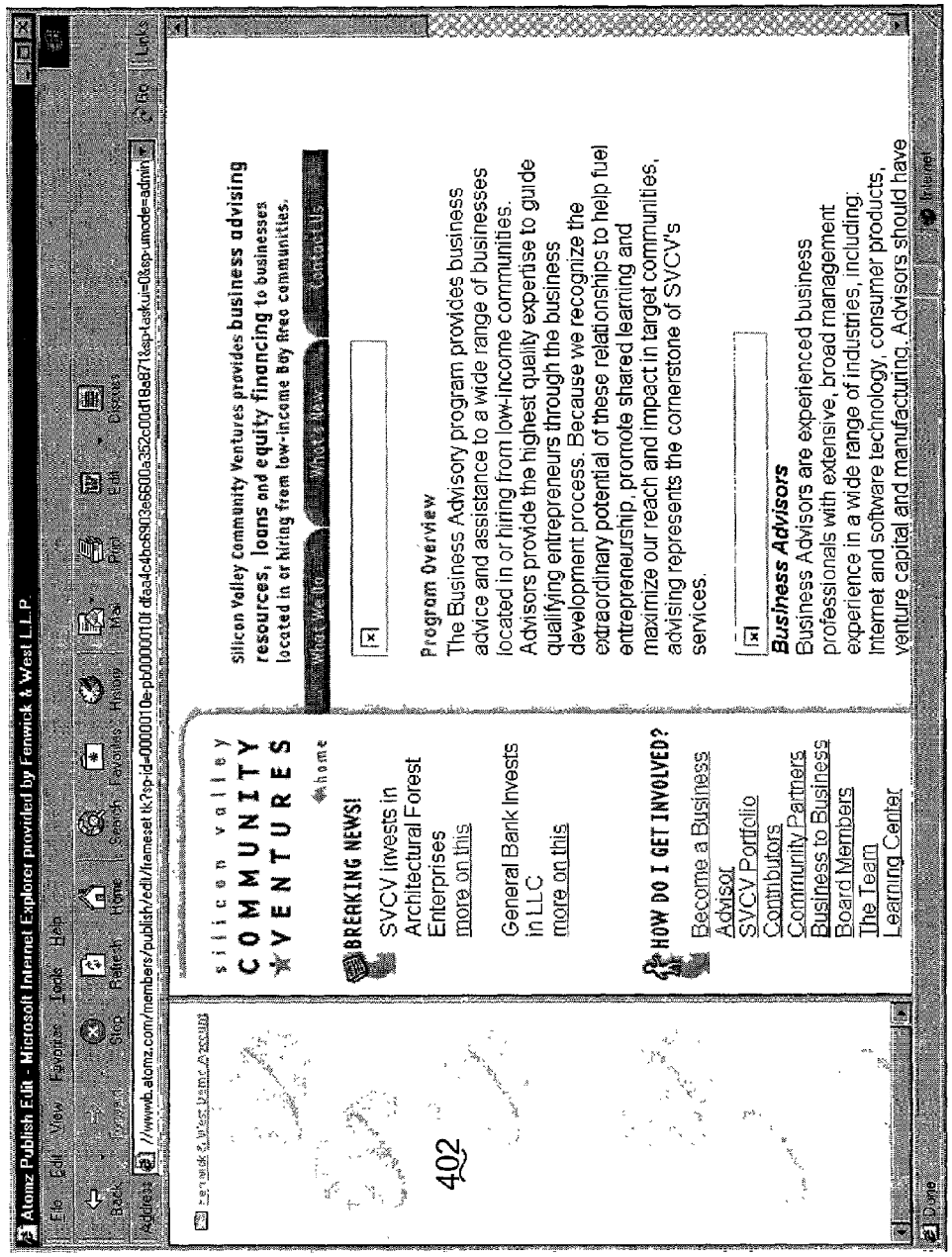
FIG. 4(c) is a screenshot of a template link test.
Figure 4D:
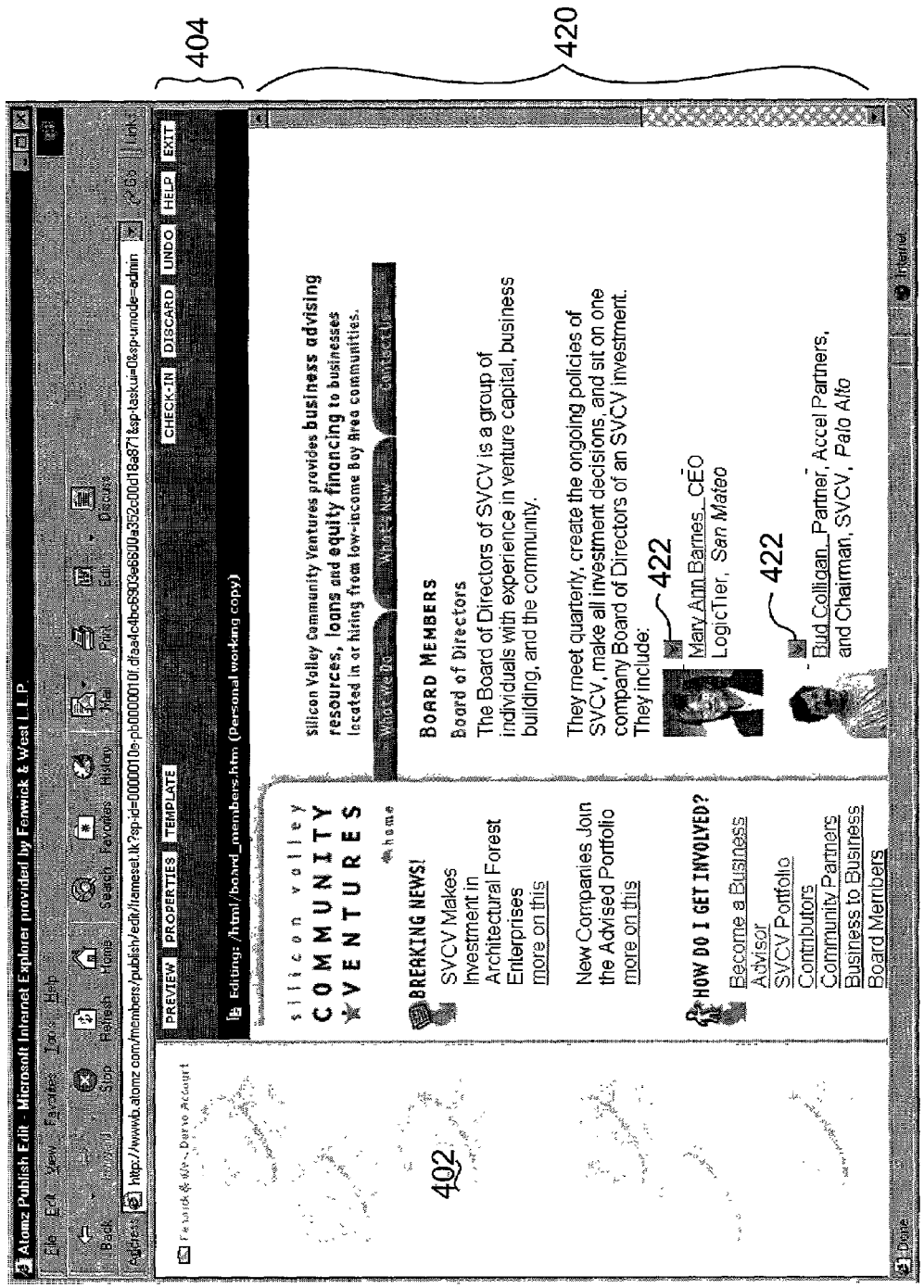
FIG. 4(d) is a screenshot showing how to perform the step of making pages in more detail.
Figure 4E:
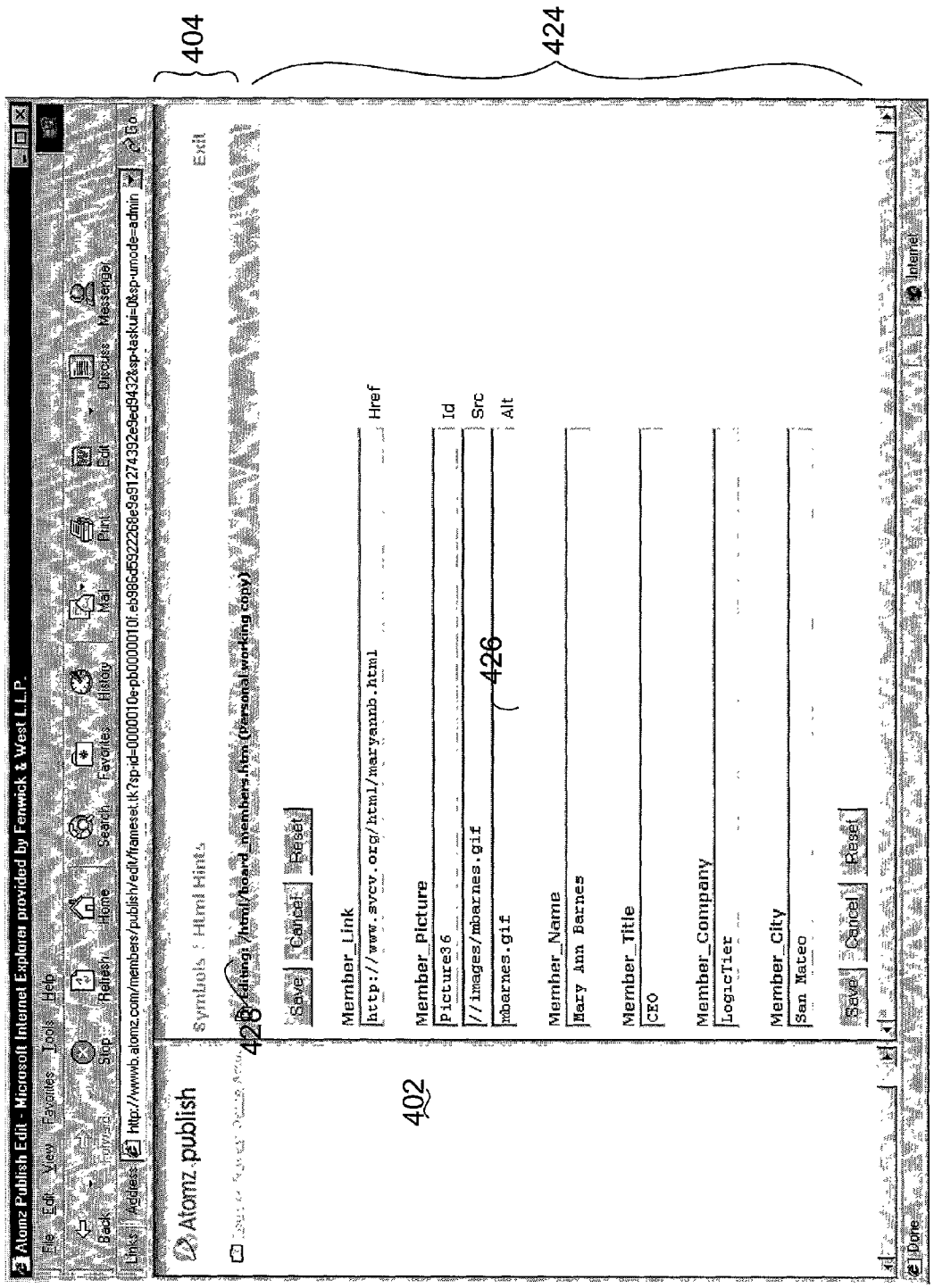
FIG. 4(e) is a screenshot showing how a user enters content into a page.
Figure 4F:
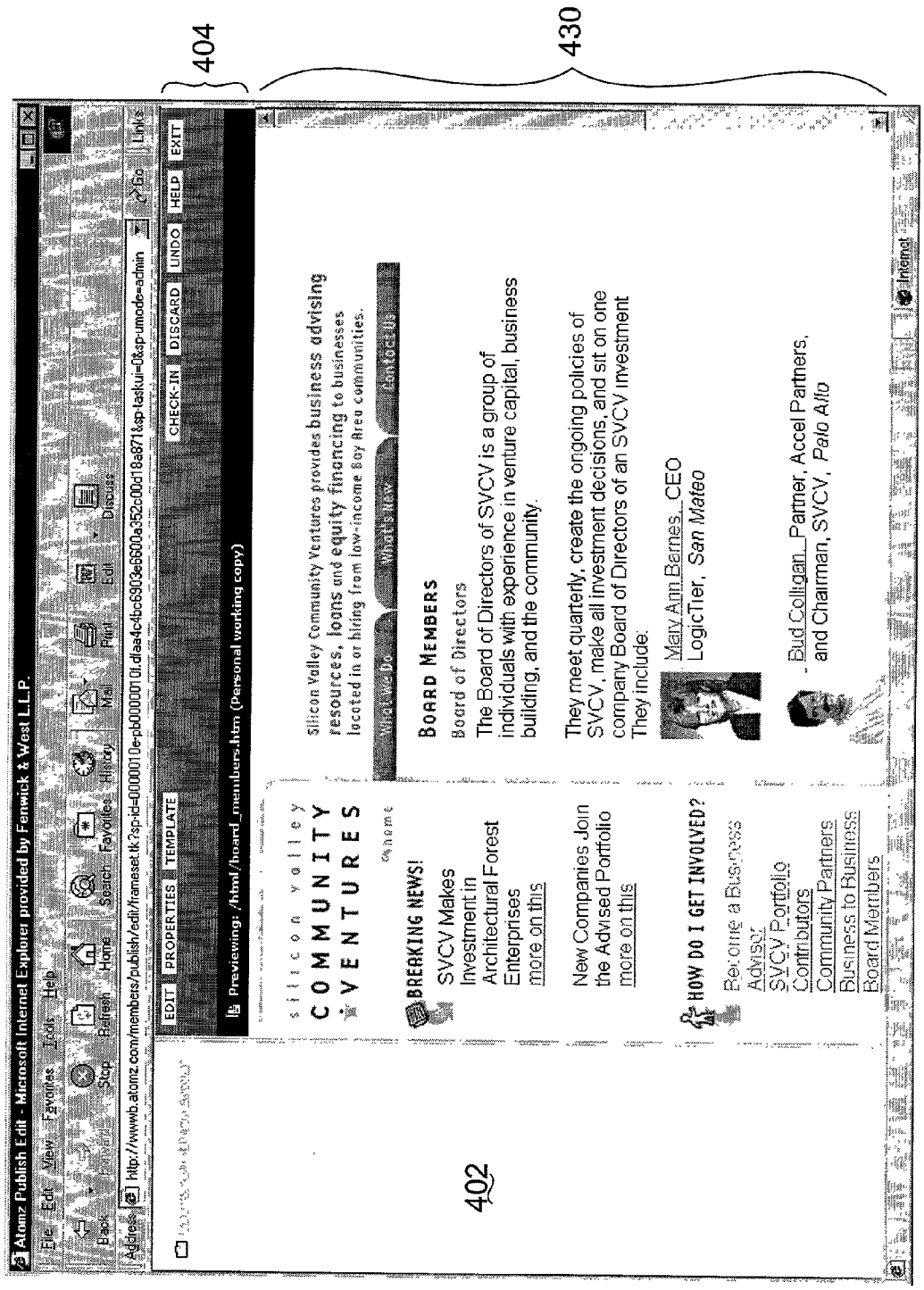
FIG. 4(f) is a screenshot showing a page preview.
Figure 4G:
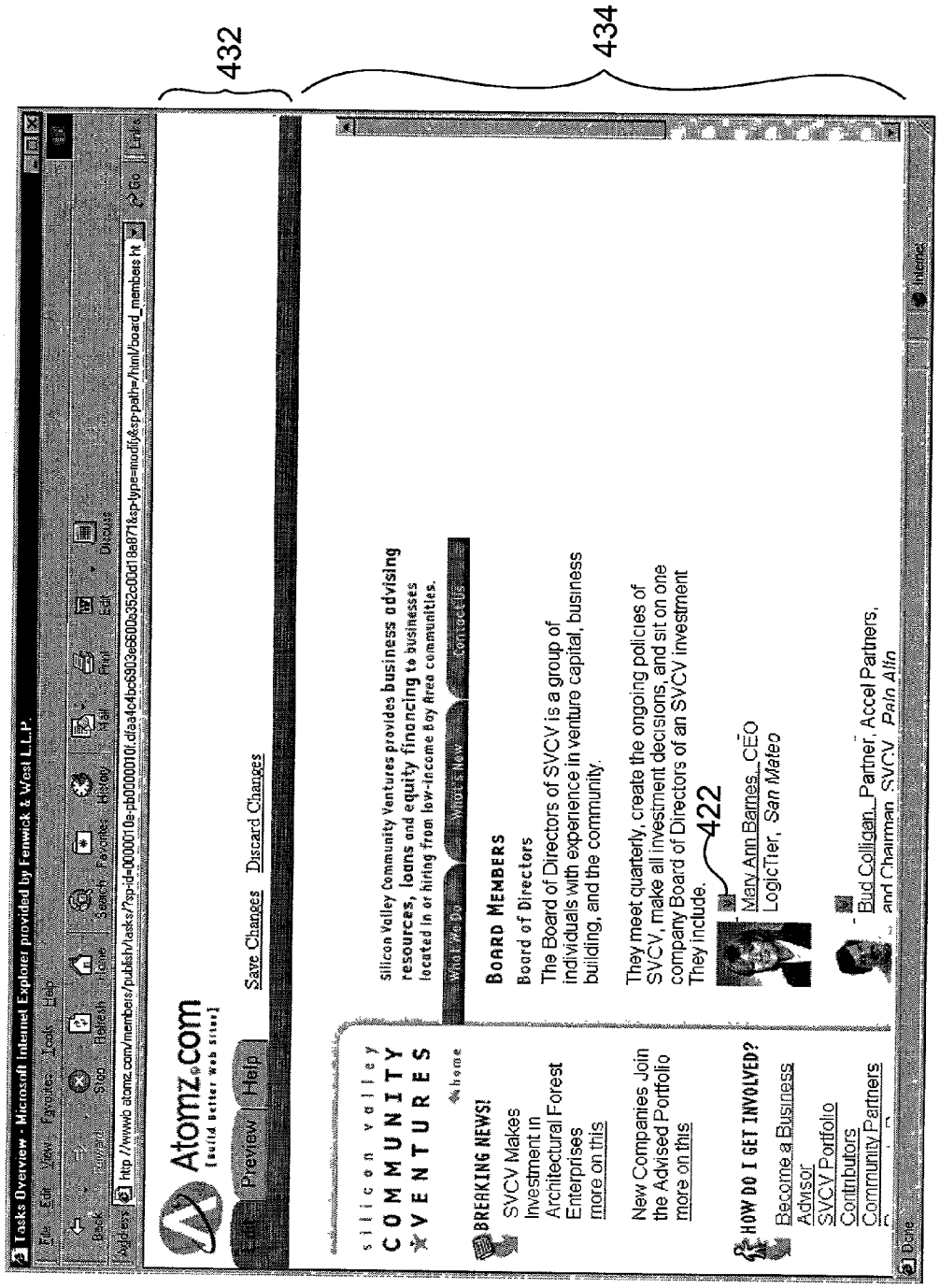
FIG. 4(g) is a screenshot showing how to create or edit a page using the task UI.
Figure 4H:
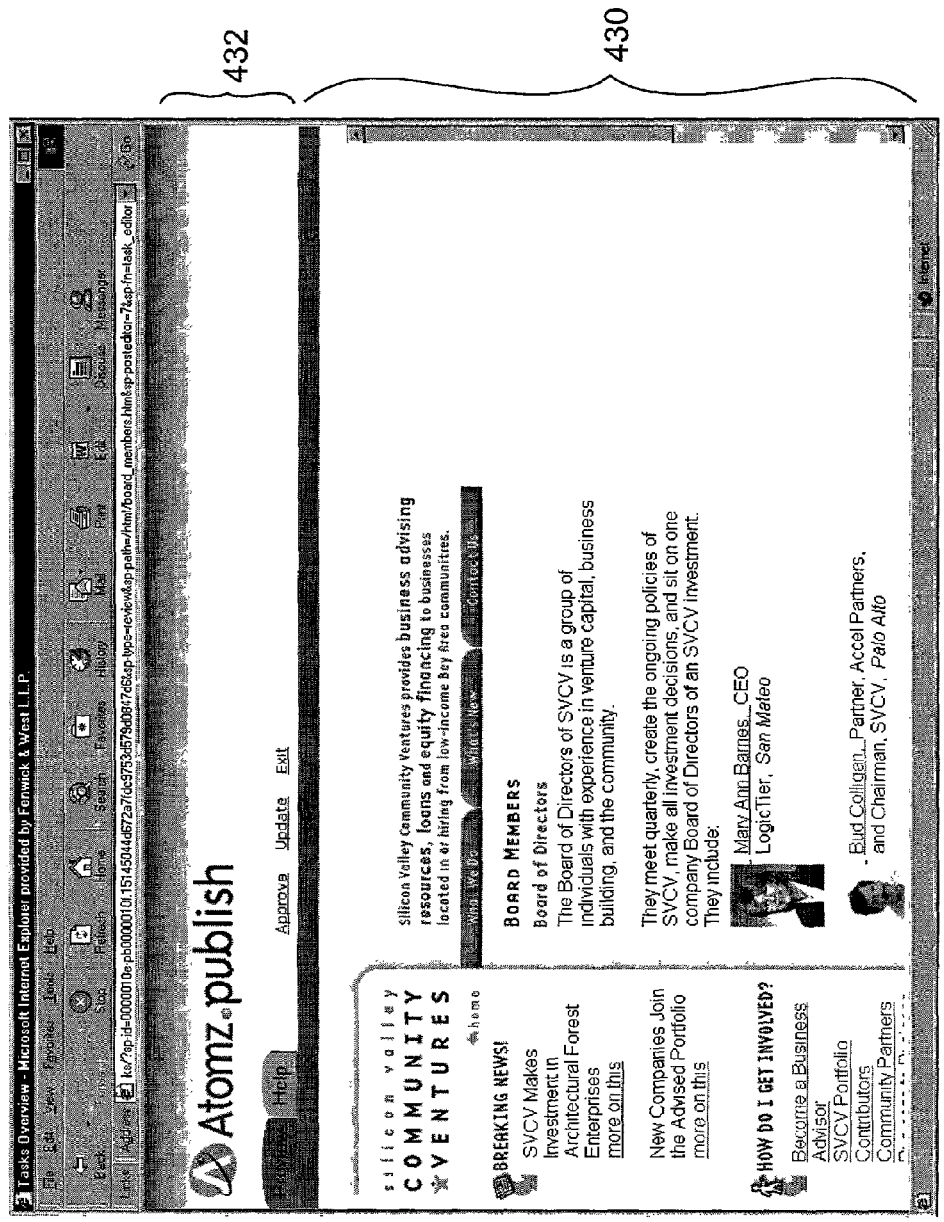
FIG. 4(h) is a screenshot showing a page preview using the task UI.

FIGS. 4(g) and 4(h) show the task UI. The task UI provides limited functionality. The task UI is normally used by lower-level users who are only authorized to perform tasks such as editing the page content of specific pages. A web site administrator or similar person determines which tasks a lower-level user may perform. Such lower-level users may not change a template, nor may they test the page by clicking on a hypertext link. Thus, the task UI keeps the lower-level user in a limited functionality area where the lower-level user can only perform the limited task of adding content to web pages. These users do not have to use HTML.

FIG. 4(*a*) is a screenshot detailing how a user defines a template. In a navigation area 402, the user can navigate through the web pages and templates stored in the web publishing system 100, and choose to edit existing pages and templates or create new pages and templates. A command area 404 provides additional functions available to the user.

The user defines the template by entering HTML code in a template code area 406. As stated earlier, the user may hand-code the HTML that comprises the template, or use a commercial product that automatically generates the markup language code. While defining the template, the user includes code that sets the areas in which content will be added, and may also enter default content for these areas. The user also may enter many different types of URLs as part of the template code, including absolute URLs, template relative URLs, and other types of URLs. There are also commands available to the user in the template code area 406. For example, the user can preview the template by clicking on the preview button 410, or save the template code by clicking on the save button 408 with a mouse.

When the user saves the template code, the client interface module 124 sends the template code to the communication module 134, which passes the template code to the template update module 126. The template update module 126 then passes the template code to the template module 118, which saves the code as a template file in the database 138.

FIG. 4(*b*) is a screenshot showing a template preview presented to the user after the user clicks on the preview button 410 of FIG. 4(*a*). After the user clicks on the preview button 410, client interface module 124 sends a preview request to the communication module 134, which passes the request to the preview module 130. The preview module 130 then sends the request to the web page module 114. The web page module retrieves the template file from the template module 118. The web page module 118 then sends the template file to the communication module 134, which sends the template file to the client interface module 124. The client interface module 124 then displays the template. As the user is in the design UI when previewing a template, the template is displayed nearly the way it would appear as part of a web page generated from the template and a content file. However, instead of being combined with a content file to form the web page, default content 412 is used. The default content takes the place of user-entered content that would normally appear in a web page generated from combining the template and a content file. This allows the user to preview the template without having to also generate a sample content file, and shows where the content from the content file would go in web pages based on the template.

Instead of taking up the entire browser window as the final web page viewed from the user server 110 would, the previewed template is seen in a preview area 414. The template preview retains the navigation area 402 and the command area 404 so that the user may continue to edit the template. This allows the user editing the template to easily determine how the template will appear on a viewer's browser, whether the links, such as link 416, work correctly, and perform other tests, while remaining within the template creation and editing process.

When previewing the template, the template is on the edit server 102. Eventually, web pages that will be generated from the template will be located on the user server 110 for normal use. This is a different location, either physically or logically, than the edit server 102. Thus, URLs in the template, particularly relative URLs in the template, are modified to be different when previewed than when viewing the web pages based on that template located on the user server 110. Otherwise, either the template preview or the web page on the user server 110 will not function correctly. Further, since the template preview does not take up the entire browser window, the template is targeted to the correct portion of the browser window.

FIG. 4(*c*) is a screenshot of a template link preview. A user may test links in a previewed template by selecting the links to determine whether they function correctly. After selecting link 416 of the template preview of FIG. 4(*b*), the linked page 418 appears in the browser window. The linked web page shown in FIG. 4(*c*) is not part of the web site managed by the web publishing system 100. Such a page from another site, not part of the web site managed by the web publishing system 100, is an external web page. When a link test brings up an external web page as seen in FIG. 4(*c*), the navigation area 402 remains, but the command area 404 does not appear. Instead, the linked external web page 418 covers the rest of the browser window. The command area 404 does not appear since the user may not edit the linked external page 418. By not providing a command area 404 relevant to the linked page, the web publishing system 100 reminds the user that the user is just previewing the link of the template, and may not edit the page. This helps prevent the user from getting confused and attempting to edit the linked page 418. In order for the linked external page 418 to appear in the correct portion of the browser window, the URL of the linked external page 418 is targeted to the desired portion of the browser window.

The user may also test a link 416 for a web page that is part of the web site managed by the web publishing system 100. A web page managed by the web publishing system is an internal web page. When the user tests a link to an internal web page, both the navigation area 402 and the command area 404 remain. The internal web page appears in the same portion of the browser window that the template preview was displayed in. The command area 404 remains since the user may edit the linked internal page. Just as with the external page, the internal web page is targeted to the correct portion of the browser window.

FIG. 4(*d*) is a screenshot showing how to create or edit web pages once the template has been created. FIG. 4(*d*) shows the design UI, although a user can edit pages using either the design UI or the task UI. When creating a web page, the user creates an instance of the template that includes content specific to that web page. This content added by the user is saved as a content file related to the template. When creating a page, the user sees almost the same information as when previewing a template. The browser window includes a navigation area 402 and a command area 404. Where the template preview included a preview area, the page edit includes a web page area 420. The particular web page area 420 shown in FIG. 4(*d*) displays a page that has already been created and has content added. A comparison of FIG. 4(*d*) to FIG. 4(*b*) shows that the default content of the template preview (FIG. 4(*b*)) has been replaced by content in the web page preview (FIG. 4(*d*)). To display the web page shown in FIG. 4(*d*), the client interface module 124 sends a request to the communication module 134, which passes the request to the preview module 130. The preview module 130 then sends the request to the web page module 114. The web page module 114 combines the template file from the template module 118 with the content file from the content module 120. When generating a web page for the page editing view, the web page module 114 includes the page edit symbols 422. The web page module 114 then returns the web page to the communication module 134, which sends it to the client interface module 124 for display.

The user adds content by selecting editable areas on the screen of FIG. 4(d). When the user created the template, the user defined what areas of the template where content will be added to create each page. Each of these areas is marked by the page edit symbol 422 in the page editing view. To add content and create a page, or to add information or edit an existing content file, the user selects the page edit symbol 422.

As with FIG. 4(b), in FIG. 4(d) the web page in the web page area 420 has a different URL and location than the template on which the web page is based. Thus, URLs in the template, particularly the various relative URLs in the template, are modified to be different in the template than the corresponding URLs in the web page based on that template so that both the web page and the template preview function correctly. Further, the web page is targeted to the correct portion of the browser window.

FIG. 4(e) is a screenshot showing how a user enters content to create a content file for a web page after selecting the page edit symbol 422. The content entering screen includes the navigation area 402 and command area 404, as well as a content entering area 424. When entering content to create a content file for a web page, a user needs little or no knowledge of HTML. In the example of FIG. 4(e), the user simply types the information into labeled fields. The information entered in this page forms the content file of a web page, as opposed to the template information that is common to each page based on that template. For example, in the field labeled, "Member_Name" 426 the user types in the name. As seen in FIG. 4(e), this is a straightforward operation. After typing in all the content, the user clicks on the "Save" button 428. This causes the client interface module 124 to send the content information that the user entered to the communication module 134. The communication module 134 sends the content information, in the form of a content file, to the content update module 128. The content update module 128 then sends the content file to the content module 120, where the content file is stored in the database 142. The user can also delete or edit the content on this screen, and save the revised content. Thus, creation and editing of the pages is a very simple task.

FIG. 4(f) is a screenshot showing a page preview. After the content is entered into a page, the user may preview the page to ensure it looks correct. A page preview, as shown in FIG. 4(f), is similar to a template preview, shown in FIG. 4(c). However, in the page preview, the web page displayed includes the template file combined with the content file for the web page, instead of just default content. To preview the page, the web page module 114 merges the template file from the template module 118 with the content file from the content module 120 to form the web page. The web page module 114 then sends the web page to the communication module 134. The communication module 134 sends the web page to the client interface module 124, which displays the web page for the user.

When using the design UI, the user may perform tests such as checking the links to make sure they function correctly. As when previewing the template, when previewing the page the design UI presents the user with the page the way it would be seen in a web browser, with the exception that the previewed template is seen in a page preview area 430 instead of the entire browser window. The page preview retains the navigation area 402 and the command area 404 so that the user may continue to edit the page. The page preview allows the user editing the page to determine how the page will appear on a viewer's browser, whether the links work correctly, and perform other tests, while remaining within the page creation and editing process.

As with FIG. 4(d), in FIG. 4(f) the web page seen in the page preview area 430 has a different location than the template on which the web page is based. Thus, URLs in the template, particularly relative URLs in the template, are modified to be different in the template than the corresponding URLs in the web page based on that template so that both the web page and the template preview function correctly. Further, the web page is targeted to the correct portion of the browser window.

If an external link were selected, the external web page would be displayed in a different portion of the browser window. The navigation area 402 would remain, but the command area 404 would not. This prevents the user from becoming confused and attempting to edit the external web page.

FIG. 4(g) is a screenshot illustrating how the user creates or edits a page using the task UI. The task UI only provides limited functionality. The task UI is normally used by lower-level users who are authorized to perform specific tasks such as adding page content to specific pages. The administrators determine which tasks a lower-level user may perform. The task UI does not allow a user to change the template or test the page by clicking on a hypertext link. If a user clicks on a link, the web publishing system 100 will present the user with a message stating that the links have been disabled. To do this, when the web page module 114 combines the template file and content file, the web page module 114 modifies the URL of the link so that the linked page is not loaded. Instead, the link URL is modified so a message indicating the links have been disabled is loaded.

Thus, the task UI keeps the lower-level user in a limited functionality area where the lower-level user can only perform limited tasks such as adding content to web pages. Users who access the web publishing system 100 through the task UI typically know little or no HTML. Thus, these users do not have access to the underlying template markup language code.

In keeping with its limited functionality, the task UI does not present the user with as much information as the design UI does. The task UI includes a task command area 432 and a page edit area 434. The page edit area 434 in the task UI includes the same information, including the same page edit symbols, as the page area 420 shown in FIG. 4(d).

To display the page in the page edit area 434, the web page module 114 merges the template with that page's specific content file. The web page module 114 also modifies the URLs in the template and content files as needed.

To edit and add content to the page, the user selects the page edit symbol 422. The user then enters content in the same manner as shown in FIG. 4(e), with the exception that in the task UI, neither the navigation area 402 nor the command area 404 is displayed. Instead, the content entering area 424 is the only area shown in the user's browser window. Just as in the design UI, the content added by the user is saved in the content file for that page.

FIG. 4(h) is a screenshot showing a page preview using the task UI. To provide the page preview, the web publishing system 100 combines the content file for that page with the template. The page preview of the task UI presents the user with a task command area 432 and a page preview area 430. The page preview in the task UI provides the limited functions of giving a user the ability to determine how the page currently being edited would appear on a viewer's browser. Since the task UI provides limited functionality, the page preview in the task UI does not include a navigation area 402. The task UI also does not allow a user to change the template or test the page by clicking on a hypertext link. If a user clicks on a link, the web publishing system 100 will present the user with a message stating that the links have been disabled. To do this, the web page module 114 modifies the URL of the link so that the linked page is not loaded. Instead, the web page module 114 modifies the link URL so a message indicating the links have been disabled is loaded.

As is apparent from the discussion above, the web page module 114 of the web publishing system 100 modifies URLs in many different situations. The user typically enters many different URLs of different types during the creation of the template or content. The URLs from both template and content are modified based on the type of URL, what context the web page exists in, and which UI is being used by the user.

Figure 5:
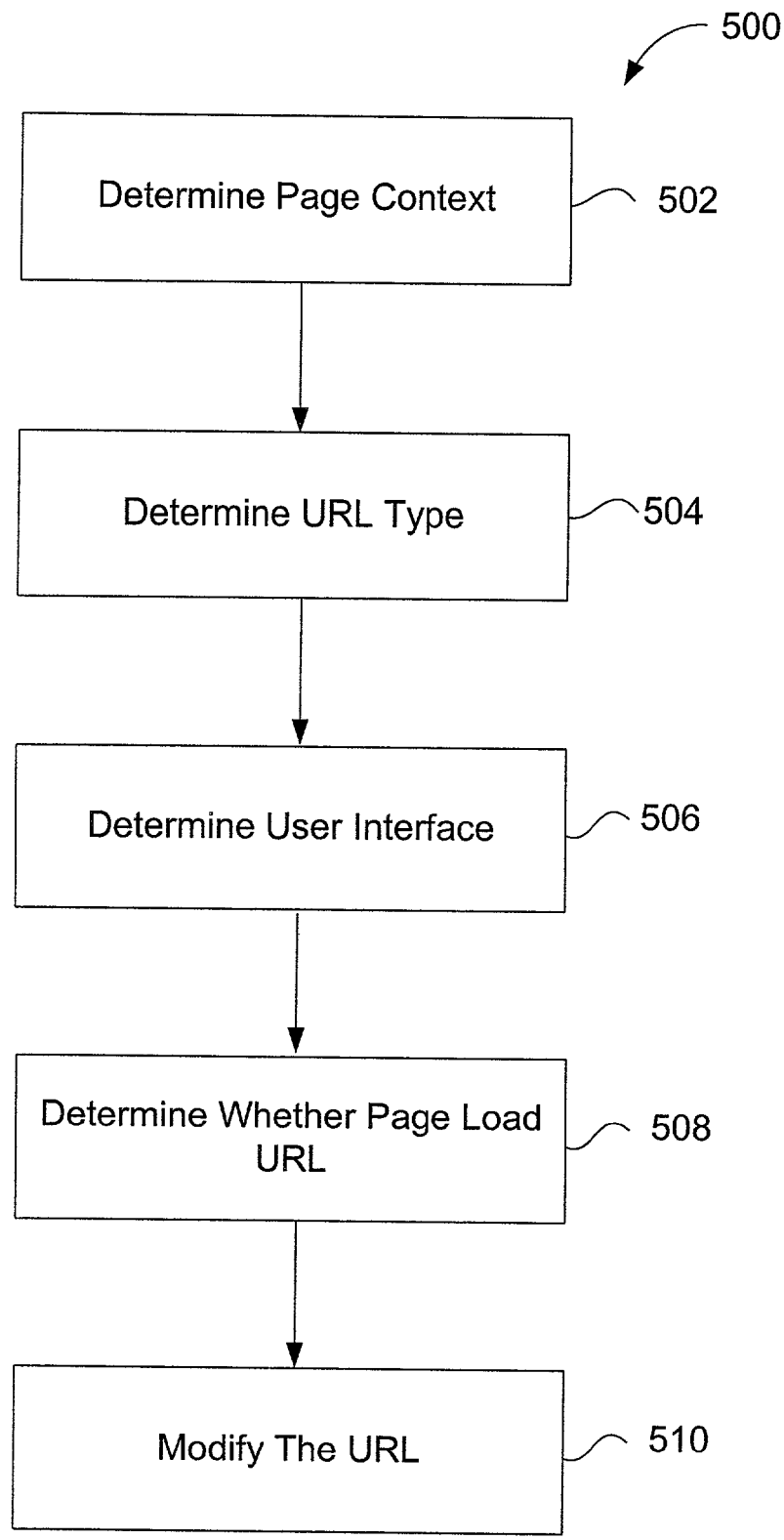
FIG. 5 is a flow chart showing the URL modification process.

URL Modification:

FIG. 5 is a flow chart showing the URL modification process 500. When a template and content are combined, the web page module 114 modifies the URLs in the resulting web page as needed. The web page module 114 determines the context 502 in which the web page will appear. There are four contexts: template preview, page preview, local stage or publish, and external stage or publish.

A template preview shows a preview of the template. A page preview shows a preview of the web page. Thus, the page preview includes both the template and content. The user views the template preview or the page preview via one of the two user interfaces, the design UI or the task UI. When viewed via one of the user interfaces, the previewed template or page is located on the edit server 102. FIG. 4(*b*) shows a template preview, and FIGS. 4(*d*), 4(*f*), 4(*g*), and 4(*h*) show page previews.

When a web page is staged or published, either locally or externally, the web page is not viewed via the user interface. Rather, the web page module 114 forms the web page combining the template and content, and then sends the web page via the publish module 116 to the staging server 108 or the user server 110. From the staging server 108 or the user server 110, the web page is viewed by viewing clients 112. Thus, under the local and external staging and publishing contexts, the location of the web page depends on the location of the staging server 108 or the user server 110.

The web page module 114 also determines the URL type 504 of each URL within the content file and template file that make up the web page. There are six URL types: absolute, site relative, template relative, page relative, system relative, and same page link. The web page module 114 determines the URL type because the six URL types are modified in different ways.

The web page module 114 determines the user interface 506 (design UI or task UI), if any, used to view the web page. If the web page is part of a template preview or page preview, the web page will be viewed via a user interface. URLs are modified differently based on the user interface used to view the web page.

The web publishing system determines whether the URL is a page load URL 508. A page load URL links to another web page and normally causes the browser to replace the current page with the linked page or bring up a new browser window. If the URL is a page load URL and the web page is viewed through one of the two user interfaces (the design UI or the task UI), the URL is modified. The URL is retargeted, and, in the case of the task UI, the link URL is modified to link to a message stating that links have been disabled, as seen in FIG. 4(*c*) and the discussion of FIG. 4(*c*), and in the discussion of FIG. 4(*g*).

Finally, the web publishing system 100 modifies the URL 510. Modifying the URL includes one or both of rewriting the URL or retargeting the URL. The URL is modified based on the context of the web page that contains the URL, the URL type, the user interface used to view the web page that contains the URL, and whether the URL is a page load URL. In some cases, the URL is not modified.

Figure 6A:
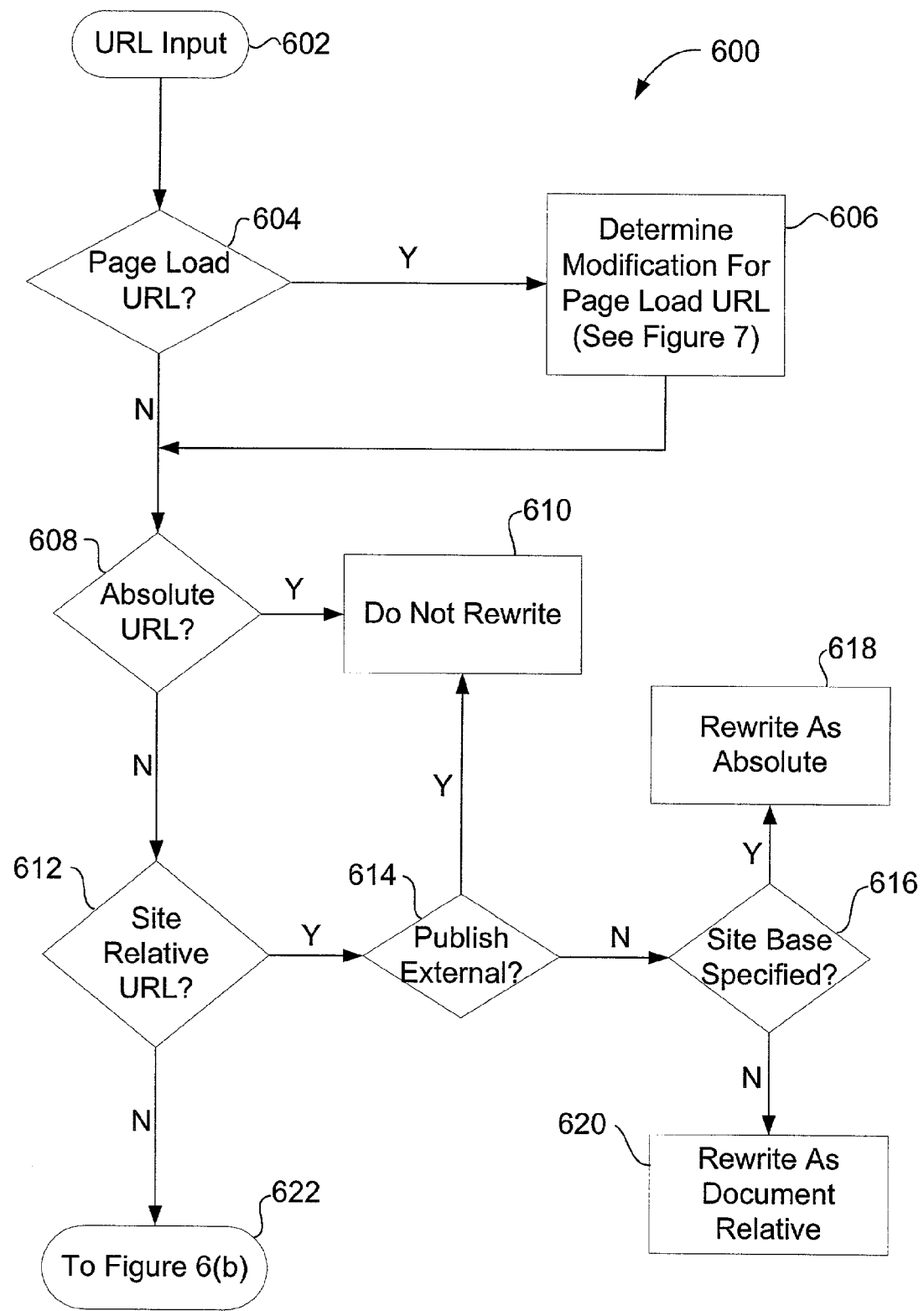
FIGS. 6(a) through 6(c) are a chart showing when the URLs are rewritten.
Figure 6B:
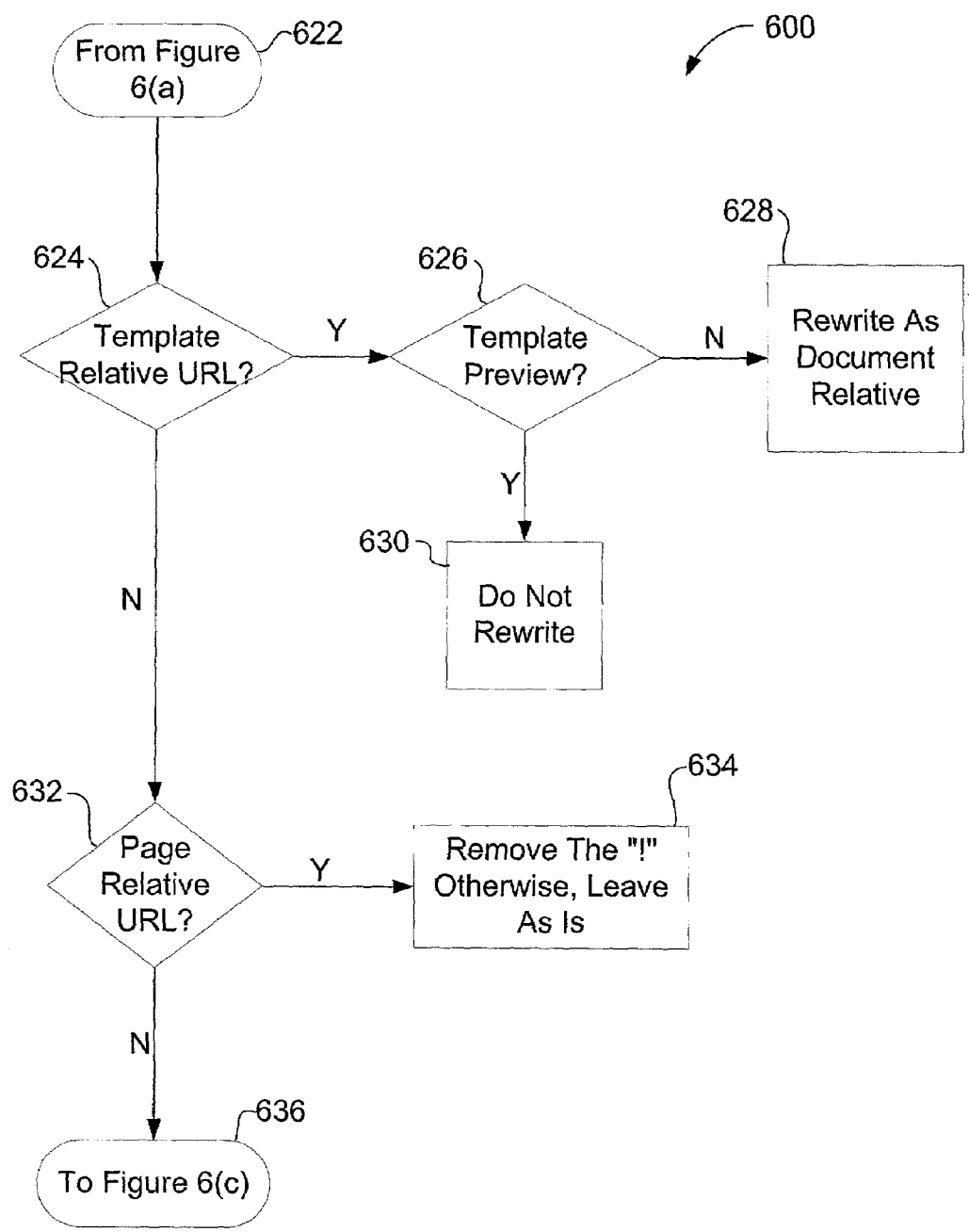
Figure 6C:
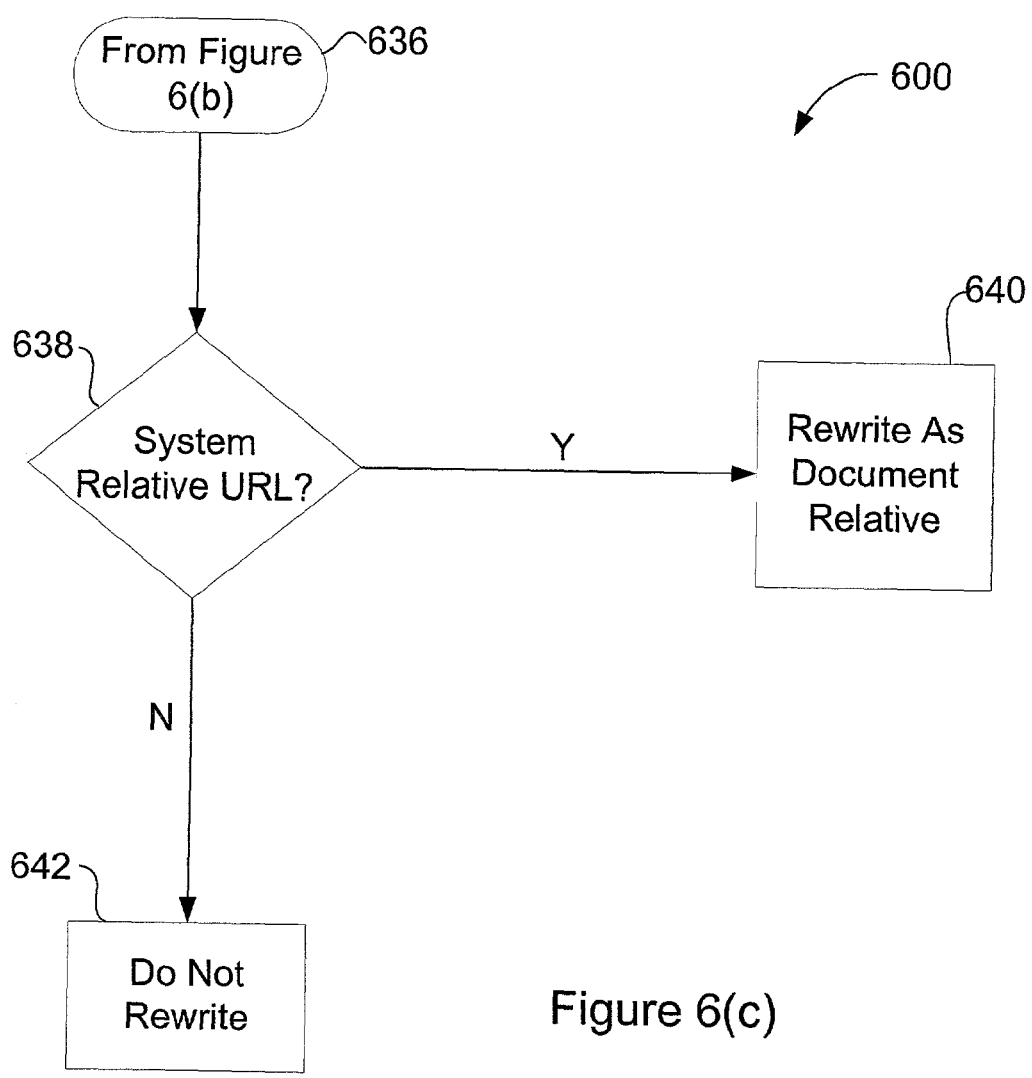

FIGS. 6(*a*) through 6(*c*) and 7 comprise a chart that details how the URLs are rewritten and retargeted. The chart 600 of FIGS. 6(*a*) through 6(*c*) begins in FIG. 6(*a*). The input 602 to the chart 600 is a URL that may have to be rewritten. This URL is input as a result of the web page module 114 combining a template from the template module 118 and a content file from the content module 120 into a resulting HTML document. Each URL encountered in the combining process, whether from the template or the content, is processed in the steps described in the following paragraphs and shown in FIGS. 6(*a*), 6(*b*), 6(*c*), and 7. The URL is checked to determine if the URL is of a type that would cause a page to load 604. In one embodiment, URLs within the "<a href>," "<area href>," and "<form action>" HTML tags are recognized as page load URLs, unless they link to the same page. If the URL is recognized as a page load URL, the URL may be modified 606, as detailed in chart 700 of FIG. 7. In some cases, the URL is then returned from the chart 700 of FIG. 7.

Figure 7:
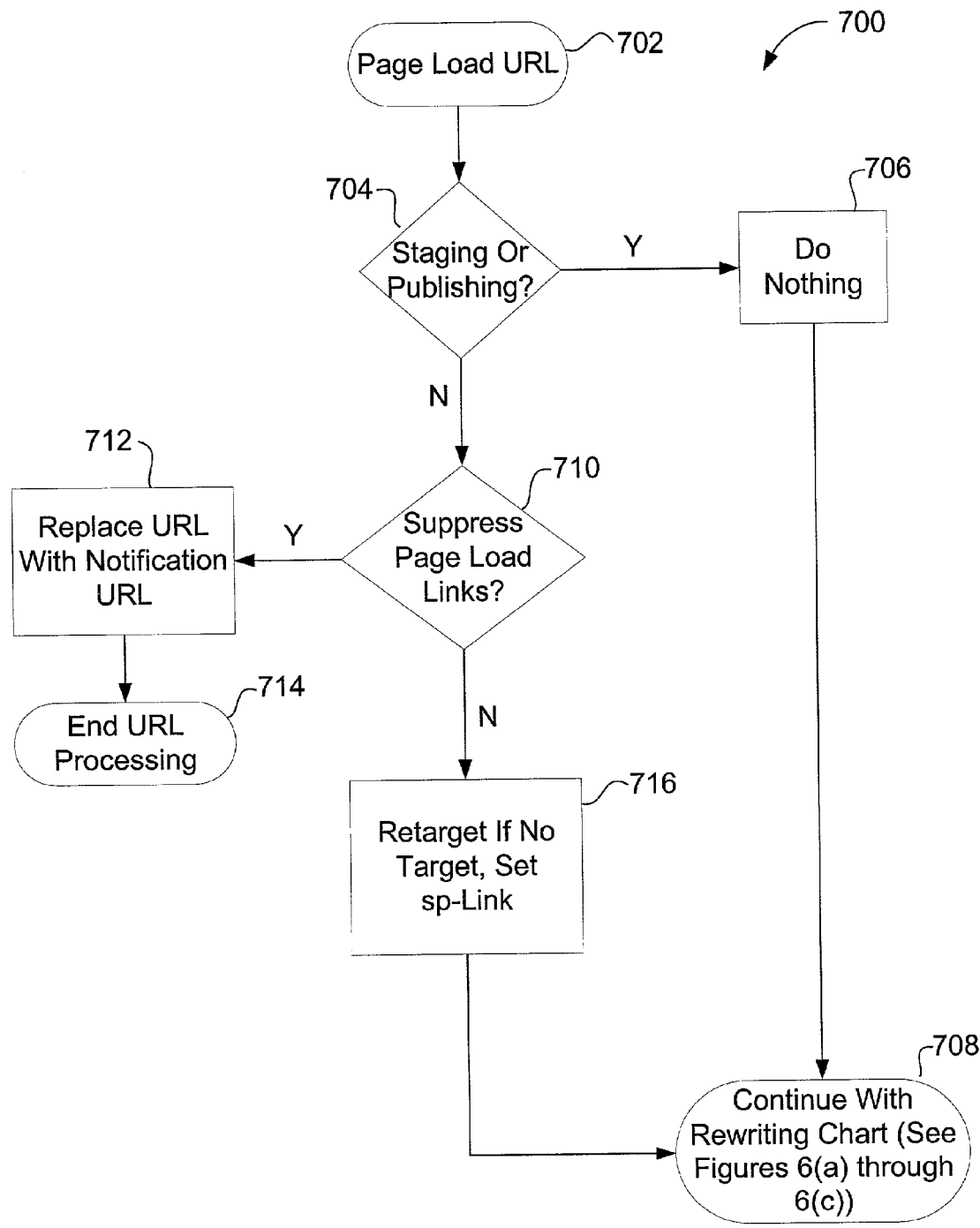
FIG. 7 is a chart showing when URLs are retargeted.

If the URL is not recognized as a page load URL or has been returned from the chart 700 of FIG. 7, the web publishing system 100 determines if the URL is an absolute URL 608. Absolute URLs have the complete address, so the web publishing system 100 treats complete URLs as absolute URLs. If the URL is an absolute URL, the URL is not rewritten 610. This is because absolute URLs work correctly no matter their location, since they include the complete address of the referenced item.

The URL is checked to determine if the URL is a site relative URL 612. The web publishing system 100 recognizes URLs that begin with a slash ("/") as site relative URLs. If the URL is a site relative URL, the context is checked 614 to determine if the context is that of an external publish. If the context is an external publish, the URL is not rewritten 610. This is because the user writes site relative URLs in the web publishing system 100 as being relative to the final location of the web site, which is the local or external published site. Thus, if the context is a local or external publish, the URL does not have to be rewritten in order to function correctly.

If the context is not an external publish, whether a site base for the web site has been specified is determined 616. If the site base has been specified, the site base is added to the site relative URL so that the site relative URL is rewritten as an absolute URL 618. That way, the rewritten URLs will reference the correct location on the user server 110.

If the site base has not been specified, the site relative URL is rewritten as a document relative URL 620. This is because the site relative URL is rewritten under the assumption that the site root on the edit server is the same as the site root on a local user server. For example, "/images/logo.gif" might be rewritten as "../logo.gif." If the URL is not a site relative URL, the URL is sent to FIG. 6(*b*) 622.

FIG. 6(*b*) is a continuation of the chart 600 of FIG. 6(*a*). The URL enters from FIG. 6(*a*) 622. The URL is checked to determine if the URL is a template relative URL 624. Document relative URLs in a template file are assumed to be template relative URLs, if no other identifying marks are present. If the URL is a template relative URL, the context is checked to determine if the context is that of a template preview 626. If the context is that of a template preview, the URL is correct and is not rewritten 630. This is because template relative URLs specify a location relative to the template, and the displayed template preview is in the correct location for these template relative URLs to function correctly. If the context is other than a template preview, the template relative URL is rewritten as a document relative URL 628. The web publishing system 100 does this by expanding the template relative URL to the full path, then reducing the URL to a page relative URL.

For example, a template is located at "/templates/tmpl.pbt" and contains an image URL written as "../images/logo.gif." The page based on the template exists at "/news/recent/page.htm." The web publishing system 100 modifies the image URL when the page is created so that the image URL still references the same image. First, the image URL from the template is changed to, "/images/logo.gif." Then, the image URL is rewritten so that it references the same image from the page location. The new image URL is, "../../images/logo.gif."

The URL is checked to determine if the URL is a page relative URL 632. Page relative URLs are identified with a marking code. Preferably, page relative URLs are identified with the marking code of an exclamation point ("!"). If the URL is page relative, the marking code is removed from the front of the URL and the URL is otherwise left untouched 634. This allows the page relative URL to function correctly in its location in a web page. However, the page relative URL will generally not function correctly in a template preview, since the page relative URL references a file in relation to the final web page location, not the template location. If the URL is not a page relative URL, the URL is sent to FIG. 6(*c*) 636.

FIG. 6(*c*) is a continuation of the chart 600 of FIG. 6(*b*). The URL enters from FIG. 6(*b*) 636. The URL is checked to determine if the URL is a system relative URL 638. System relative URLs are identified with a marking code. Preferably, system relative URLs are identified with the marking code of "pub:". If the URL is a system relative URL, the URL is rewritten as a document relative URL 640. To rewrite the system relative URL, the "pub:" is removed. The rest of the URL is a site-relative URL, which is relative to the top of the publish system. The top of the publish system is not necessarily the same as the top of the actual site. Thus, next the same modification as detailed above with respect to template relative URLs. The web publishing system 100 expands the URL to the full path, then reduces the URL to a page relative URL.

If the URL reaches this point and has not modified the URL or determined that no modification is necessary, the URL is either a same page link or a type of URL the web publishing system 100 does not recognize. In either case, the web publishing system 100 does not rewrite 642 the URL.

FIG. 7 is a chart 700 detailing the function of determining whether the URL needs to be retargeted, and if so, retargeting the URL. The page load URL is first input 702. The context is checked 704 to determine if the context is a staging or publishing context, either local or external. If the context is a staging or publishing context, the URL is not retargeted 706. The unmodified URL is output 708 back to the URL rewriting chart of FIG. 6.

If the context is not a staging or publishing context, the user interface is checked to determine whether the page load links should be suppressed 710. If the user is using the task UI, the page load links should be suppressed. Otherwise, the page load links should not be suppressed. If user is using the task UI and the page load links should be suppressed, the page load URL is replaced 712 with a notification URL. A notification URL is a link to a notification message stating that the link has been disabled. As a result of the notification URL, when the user clicks on a page load link in the task UI, the user will be presented with a notification that links have been disabled in the task UI. After the URL has been replaced with a notification URL, no further processing need be performed 714 on that URL. The URL is not returned to the rewriting chart, since the URL already has been completely rewritten.

If the page load links should not be suppressed, the URL is retargeted 716. Retargeting URLs provides the advantages of presenting the page in the correct part of the browser window and signaling the web publishing system 100 that a page has been loaded. Preferably, the URL is retargeted only if the URL does not already have a target specified, so that if the URL is an external URL that targets its own window, the targeted external URL works properly. As shown in FIG. 4(*c*), when a user links to another page, the linked page does not take up the entire browser window. Instead, the URL is retargeted so that the linked page appears in one area of the browser window, and a navigation area 402 remains in the rest of the window. Internal URLs are retargeted differently than external URLs, as described with respect to FIG. 4(*c*), above. In order to place the linked page in the appropriate browser window area, the target attribute of the linked page is changed to the correct frame. Further, when a URL is retargeted, a parameter is also added to the URL to capture the fact that a new page was loaded. When the web publishing system 100 sees this parameter, it knows a new page was loaded via a link and can update the user interface and internal state as needed. After being retargeted, the modified URL is output 708 back to the URL rewriting chart in FIG. 6(*a*).

While the invention has been particularly shown and described with reference to a preferred embodiment, it will be understood by persons skilled in the relevant art that various changes in form and details can be made therein without departing from the spirit and scope of the invention. For example, indirect addresses besides URLs may be modified.

APPENDIX I

The list of tags:
<publish-a>
<publish-edit-marker>
<publish-file-index>
<publish-if-file-index-empty> & <publish-if-file-index-not-empty>
<publish-form-control>
<publish-form-option>
<publish-get>
<publish-group>
<publish-if-cross-post> and <publish-if-not-cross-post>
<publish-if-empty> and <publish-if-not-empty>
<publish-if-loop-empty> and <publish-if-loop-not-empty>
<publish-img>
<publish-include>
<publish-index-anchor>
<publish-index-file>
<publish-index-link>
<publish-loop>
<publish-loop-count>

<publish-loop-counter>
<publish-loop-index>
<publish-lt> & <publish-gt>
<publish-meta>
<publish-rewrite>
<publish-text>
<publish-title>

<publish-a></publish-a>

Used to add HTML links and anchors to Atomz Publish templates. Either a pbname or a pbsource attribute is mandatory.

Attributes of <publish-a> tags: pbname, pbsource, pblabel, pblabel_xxx, pbeditmarker, pbeditmarkerdirection, pbhide, pbcontrol, href, name, target, other

- pbname: The pbname attribute is mandatory if the content of the <publish-a> tag is editable. The value of the pbname attribute must be a unique name.
- pbsource: The value of this attribute must be set to the value of a pbname that belongs to another <publish-a> tag on the template (unless it's inside a <publish-file-index>, in which case, it must refer to the pbname of a tag on the indexed pages.) When pbsource is specified, the <publish-a> tag will not be editable and it won't appear on an edit-form.
- pblabel: pblabel attributes help create user-friendly URL edit-fields on edit-forms. The value assigned to the pblabel will appear above the edit-field created for the publish-a tag.
- pblabel_xxx: The pblabel_xxx attribute allows you to add labels for each edit-field generated by an editable attribute. These labels can help clarify the expected input or offer brief instructions to people entering information in the edit-form. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.
- pbeditmarker: This optional attribute determines whether the orange edit-marker will appear beside the edit-field in the Edit-Marker mode or not. If pbeditmarker is omitted, the value will default to yes and the edit-marker will appear. If the value of pbeditmarker is set to no, the edit-marker will not show up.
- pbeditmarkerdirection: This attribute control which way the arrow in the orange edit-markers points. It can take four possible values: left, right, up or down. If the attribute is omitted, the value defaults to right.
- pbhide: This attribute hides the output of an editable Atomz Publish template tag. <publish-a> tags which have a pbhide attribute set to yes will allow users to edit the content of the <publish-a> tag, but that content will not be passed to the pages created with that template. The default value of pbhide is no.
- pbcontrol: The pbcontrol attribute specifies that the <publish-a> tag should draw its content from a pull-down menu created with a <publish-form-control> tag. You must have or include a <publish-form-control> on your template to use this attribute.
- href: This attribute specifies the target URL. Use an asterisk to make the href attribute editable. Any path information that follows a * will be used as the default value.
- name: The name attribute defines the scroll position. Use an asterisk to make this value editable. Any name information that follows the * will be used as the default value.
- target: Use an asterisk to make the value of the target attribute editable. Any name information that follows the * will be used as the default value.
- other: All other attributes can be set to be editable with an asterisk. Any information that follows the * will be used as the default value.

<publish-edit-marker> . . . </publish-edit-marker>

Used by the template designer to specify the location of an edit symbol (also known as an edit marker) for an Atomz Publish tag or group. The pbname attribute is mandatory.

Attributes of <publish-edit-marker> tags: pbname, pbeditmarkerdirection

- pbname: The pbname attribute is mandatory. The value of this attribute must be set to the value of another pbname on the page.
- pbeditmarkerdirection: This attribute control which way the arrow in the orange edit-markers points. It can take four possible values: left, right, up or down. If the attribute is omitted, the value defaults to right.

<publish-file-index> . . . </publish-file-index>

The <publish-file-index> tag creates a list of records from content that lives on other pages of the Atomz Publish site. The pbsourcefiles attribute is mandatory.

Attributes of <publish-file-index> tags: pbsourcefiles, pbsortname, pbsortformat, pbsortdirection, pbmaxitems, pbfilter, pbfiltername

- pbsourcefiles: The pbsourcefiles attribute specifies which files should be considered when building the file-index. The value of this attribute may include wildcards or several file specifications (different paths must be separated by semi-colons).
- pbsortname: The pbsortname attribute allows a template designer to sort a file-index according to the contents of a specific edit-field. pbsortname should be assigned the value of the pbname of the edit-field that should determine how the file-list is sorted. If this attribute is omitted, the file-index will default to be sorted by filename. You may use up to ten pbsortnames (pbsortname, pbsortname1–pbsortname9) to specify multiple sort fields.
- pbsort format: This attribute controls the type of sort performed. It may be assigned a value of either text or number. If this attribute is omitted, the value will default to text. You may use up to ten pbsortformats (pbsortformat, pbsortformat1–pbsortformat9) to specify multiple sort formats.
- pbsortdirection: This attribute controls the direction of a sort. It may be assigned a value of either ascending or descending. If this attribute is omitted, the value will default to ascending. You may use up to ten pbsortdirections (pbsortdirection, pbsortdirection1–pbsortdirection9) to specify multiple sort directions.
- pbmaxitems: This attribute can be set to an integer that determines the maximum number of entries displayed in the file-index. This allows the file-index to have fewer entries than the actual number of files. If the pbmaxitems attribute is omitted, all files that match the pattern will be indexed.
- pbfilter: The pbfilter attribute allows you to filter the content of a file-index based on the values in a particular field (which may be specified with a pbfiltername attribute). Filter expressions start with an operator (~ or > for example) that indicates the type of comparison. All comparisons are alphabetic (or "{text}" based)—"A" is less than "B" and "100" is less than "20" (though not less than "020") and case-sensitive by default. You can change this default with the options " {nocase}" and "{number}".

pbfiltername: This is the name of the field used for filtering. If this is omitted then filtering defaults to the pbsortname field. To do filtering, either pbfiltername or pbsortname must be present.

<publish-if-file-index-empty> . . . </publish-if-file-index-empty><publish-if-file-index-not-empty> . . . </publish-if-file-index-not-empty>

Encloses HTML that is included on templated pages depending on whether or not any files meet the criteria defined in the value of the pbsourcefiles attribute. The pbsourcefiles attribute is mandatory.

Attributes of <publish-if-file-index-empty> and <publish-if-file-index-not-empty> tags: pbsourcefiles pbsourcefiles: The pbsourcefiles attribute specifies which files should be considered when building the file-index. The value of this attribute may include wildcards or several file specifications.

<publish-form-control> . . . </publish-form-control>

Used with <publish-form-option> to create pull-down menus that can be used with any editable template tag. The pbname attribute is mandatory.

Attributes of <publish-form-control> tags:pbname, pblabel, pbseparator, size, multiple pbname: The pbname attribute is mandatory. The value of the pbname attribute must be unique.

pblabel: pblabel attributes help identify the pull-down options on edit-forms. The value assigned to the pblabel will appear to the left of the pull-down menu.

pbseparator: This attribute is only relevant when multiple is specified. If the Editor chooses more than one option from the pull-down menu, the values are joined using the pbseparator. The default pbseparator is a comma followed by a blank space (",").

size: The size attribute determines the number of pull-down options that appear when the menu is displayed.

multiple: When multiple is specified, an Editor may choose more than one option from the pull-down menu.

<publish-form-option> . . . </publish-form-option>

Used with <publish-form-control> to create pull-down menus that can be used with any editable template tag.

Attributes of <publish-form-option> tags: pbset_xxx pbset_xxx: The pbset_xxx attribute can be used to pass values to any editable attribute. It defaults to the content of the tag.

<publish-get>

The <publish-get> tag grabs and inserts template field data anywhere on a page.

Attributes of publish-get tags: pbsource, pbattr pbsource: The pbsource attribute is mandatory and must be set to the pbname of a content tag on the template or on templated pages included in a file-index. The <publish-get> tag draws its content from the tag identified in its pbsource.

pbattr: The pbattr attribute is set to the name of an attribute contained in the Atomz Publish tag identified by the pbsource. For tags without attributes (<publish-title>, <publish-text>), pbattr is ignored.

<publish-group> . . . </publish-group>

The <publish-group> tag allows editors to group multiple edit-fields on a single edit-form. The pbname attribute is mandatory.

Attributes of publish-group tags: pbname, pblabel, pbeditmarker, pbeditmarkerdirection pbname: The pbname attribute is mandatory. However, the value of the pbname attribute does not need to be unique. All Atomz Publish tags that are enclosed with <publish-group> tag that have the same pbname will be edited with the same edit-form.

pblabel: pblabel attributes help create user-friendly edit-fields on edit-input forms. The value assigned to the pblabel will appear above the edit-fields created for the <publish-group> tag.

pbeditmarker: This optional attribute determines whether the orange edit-marker will appear at the point where the group tag would display in the Edit-Marker mode or not. If pbeditmarker is omitted, the value will default to yes and the edit-marker will appear. If the value of pbeditmarker is set to no, the edit-marker will not show up.

pbeditmarkerdirection: This attribute control which way the arrow in the orange edit-markers points. It can take four possible values: left, right, up or down. If the attribute is omitted, the value defaults to right.

<publish-if-cross-post> . . . </publish-if-cross-post><publish-if-not-cross-post> . . . </publish-if-not-cross-post>

Allows you to display content conditionally depending on whether a page is a cross-post destination or not.

Attributes of <publish-if-cross-post> and <publish-if-not-cross-post> tags: none There are no attributes.

<publish-if-empty> . . . </publish-if-empty><publish-if-not-empty> . . . </publish-if-not-empty>

These tags look at the Atomz Publish tag identified by their pbsource attribute (the pbsource attribute is mandatory, and must match the pbname value for a content tag elsewhere on the template.) If there is no content (whitespace is considered as no content) stored for the named tag then everything inside the <publish-if-empty> tag is included. If there is content in the named tag then the HTML inside the <publish-if-empty> tag is not included. The <publish-if-not-empty> tag is just the opposite.

Attributes of <publish-if-empty> and <publish-if-not-empty> tags: pbsource, pbattr pbsource: The pbsource attribute is mandatory. Its value must be set to the pbname of another content tag on the template.

pbattr: The pbattr attribute identifies the attribute field that the <publish-if-empty> or <publish-if-not-empty> tag should look at when determining whether a source tag is empty or not.

<publish-if-loop-empty> . . . </publish-if-loop-empty><publish-if-loop-not-empty> . . . </publish-if-loop-not-empty>

Encloses HTML that is included only if the specified loop is or is not empty.

Attributes of <publish-if-loop-empty> and <publish-if-loop-not-empty> tags: pbsource pbsource: The pbsource must be set to the value of the pbname of a <publish-loop> tag. You will almost always want to specify the pbsource attribute. However, if you use either the <publish-if-loop-not-empty> or the <publish-if-loop-empty> tag inside a loop, the tags will draw their source from the immediately enclosing loop by default and will not require a pbsource.

<publish-img>

Maps to the HTML <img> tag. Either the pbname or pbsource attribute is mandatory.

Attributes of <publish-img> tags:pbname, pbsource, pblabel, pblabel_xxx pbeditmarker, pbeditmarkerdirection, pbhide, pbcontrol, src, width, height, border, alt, other

- pbname: The pbname attribute is mandatory if the content of the <publish-img> tag is editable. The value of the pbname attribute must be a unique name within the template.
- pbsource: The value of this attribute must be set to the value of a pbname that belongs to another <publish-img> tag on the template. It is useful to set the pbsource when an image is repeated in several places on a templated page.
- pblabel: pblabel attributes help create user-friendly image edit-fields on edit-forms. The value assigned to the pblabel will appear above the edit-fields created by the <publish-img> tag.
- pblabel_xxx: The pblabel_xxx attribute allows you to add labels for each edit-field generated by an editable attribute. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.
- pbeditmarker: This optional attribute determines whether the orange edit-marker will appear beside the edit-field in Edit-Marker mode or not. If pbeditmarker is omitted, the value will default to yes and the edit-marker will appear. If the value of pbeditmarker is set to no, the edit-marker will not be displayed.
- pbeditmarkerdirection: This attribute control which way the arrow in the orange edit-markers points. It can take four possible values: left, right, up or down. If the attribute is omitted, the value defaults to right.
- pbhide: This attribute hides the output of an editable Atomz Publish template tag. <publish-img> tags which have a pbhide attribute set to yes will allow users to edit the content of the <publish-img> tag, but that content will not be passed to the pages created with that template. The default value of pbhide is no.
- pbcontrol: The pbcontrol attribute specifies that the <publish-img> tag should draw its content from a pull-down menu created with a <publish-form-control> tag. You must have or include a <publish-form-control> on your template to use this attribute.
- src: the src attribute defines the source URL. Use an asterisk to make the image-source editable. Any path information that follows the * will be used as a default value.
- alt: the alt attribute defines the alternate text. Use an asterisk to make the alt-text editable. Any text that follows the * will be the default value.
- width: the width attribute defines the image width. Use an asterisk to make the width editable. Any integer that follows the * will be used as a default width value.
- height: the height attribute defines the image height. Use an asterisk to make the height editable. Any integer that follows the * will be used as the default height value.
- border: the border attribute defines the image border. Use an asterisk to make the border editable. If you do not use an asterisk, the border for all images created will be the border you have chosen and the user will not be able to change it.
- other: All other HTML attributes can be made editable with an asterisk.

<publish-include>

The <publish-include> tag is used to incorporate HTML into a template from another file. It allows a common fragment of HTML to be shared by several templates. Any Atomz Publish tags that are included are treated as part of the including template. The pbfile attribute is required.

Attributes of <publish-include> tags: pbfile, pbignoredependency

- pbfile: The pbfile attribute is required. The value must consist of the name and full path of the included file. The path should start with a "/" which represents the top level of your Atomz Publish account.
- pbignoredependency: If a pbignoredependency attribute is set, the including file will not be dependent on the included file. If the include file is changed, the template will not be flagged as modified and your pages will not be republished.

<publish-index-anchor>

The <publish-index-anchor> tag automatically creates an anchor (ie. <a name=...>) with a unique name. It is used to create named anchors for items within indexed loops. Used together, the <publish-index-anchor> and <publish-index-link> tags automate the creation of links from entries in an index to corresponding entries in a loop. The pbname attribute is required.

Attributes of <publish-index-anchor> tags: pbname, name, other

- pbname: The pbname attribute is required. The value must be unique.
- name: If a name attribute is supplied it is used as a prefix for the anchor. If no name attribute is supplied the anchor(s) will simply be named "1", "2", etc.
- other: Any other attributes in the <publish-index-anchor> tag are passed through unchanged to the <a> tag.

<publish-index-file>

The <publish-index-file> may only appear inside a <publish-file-index> tag. It is replaced with the pathname of the file currently being enumerated by the <publish-file-index> tag that contains it.

Attributes of <publish-index-file> tags: none

There are no attributes.

<publish-index-link> . . . </publish-index-link>

This tag is intended for use inside <publish-file-index> or publish-loop-index tags. It creates a link (ie. <a href=...>) from an index entry to the thing being—either a named anchor or an indexed page.

Attributes of <publish-index-link> tags:pbsource, href, other

- pbsource: The pbsource attribute is not mandatory. When it is present, its value identifies the <publish-a> or <publish-index-anchor> tag to which the <publish-index-link> will link. When used with an index-file, the pbsource should not specified, and the tag will default to produce a link for each page referenced by the <publish-index-file> tag.
- href: If present, the value of the href attribute is appended to the URL generated by the <publish-index-link> tag. This allows you include CGI parameters or, in the case of a file-index, an anchor name.
- other All other attributes of the <publish-index-link> tag are passed unchanged to the HTML <a> tag generated.

<publish-loop> . . . </publish-loop>

The <publish-loop> tag is used to create repeating sets of items, like tables or lists. Everything inside this tag is repeated for each iteration of the loop. Loops may be nested. The pbname attribute is mandatory.

Attributes of <publish-loop> tags: pbname pbname: The pbname attribute is mandatory. The value of the pbname attribute must be a unique name.

<publish-loop-count>

The <publish-loop-count> tag is replaced with the number of entries in the specified loop tag.

Attributes of <publish-loop-count> tags: pbsource pbsource: The pbsource attribute must refer to the pbname attribute of a <publish-loop> tag at the same level of loop-nesting or in outer loops. If the pbsource tag is omitted, the <publish-loop-count> tag will reference the immediately enclosing loop.

<publish-loop-counter>

The <publish-loop-counter> tag is replaced with the number of the current iteration of a loop. ie. On the first loop iteration this has the value "1 ", on the second iteration it is "2" and so on.

Attributes of <publish-loop-counter> tags: pbsource pbsource: The pbsource tag must be set to the pbname of an enclosing <publish-loop> tag. If the pbsource is omitted, the <publish-loop-counter> tag will reference the immediately enclosing loop by default.

<publish-loop-index> . . . </publish-loop-index>

The <publish-loop-index> creates an index that corresponds to a publish-loop. As records are added, removed, or rearranged within the source <publish-loop>, the <publish-loop-index> tag automatically revises its index to keep in sync. The pbsource attribute is mandatory.

Attributes of <publish-loop-index> tags: pbsource, pbsortname, pbsortdirection, pbmaxitems pbsource: The pbsource is mandatory and must be set to the value of the pbname of a <publish-loop> tag. All edit-fields within the publish-loop-index must refer to edit-fields named in the source <publish-loop>.

pbsortname: The pbsortname attribute allows a template designer to sort the fields in a publish-loop index alphabetically. It should be assigned the value of the pbname of the edit-field that you wish to determine how the loop index is sorted. If this attribute is omitted, the order of the loop-index will default to match the order of the records in the original source-loop.

pbsortdirection: This attribute controls the direction of an alphabetical sort. It may be assigned a value of either ascending or descending. If this attribute is omitted, the value will default to ascending.

pbmaxitems: This attribute can be set to an integer that determines the maximum number of entries displayed in the loop-index. This allows the loop-index to have fewer entries than the source-loop. If the pbmaxitems attribute is omitted, all records in the source-loop will be indexed by the loop-index.

<publish-lt > & <publish-gt>

The <publish-lt > and <publish-gt> tags are replaced with <and > respectively. You can use <publish-lt > and <publish-gt> to hide the <and > symbols from Atomz Publish just as you would use the < and > entities to hide <and > from a browser.

Attributes of <publish-lt> tags: none

There are no attributes.

<publish-meta>

The <publish-meta> tag maps to the HTML <meta> tag. The pbname attribute is mandatory.

Attributes of <publish-meta> tags: pbname, pblabel, pblabel_xxx, pbcontrol, name, content, other pbname: This is a mandatory attribute. The value of the pbname attribute must be unique.

pblabel: pblabel attributes help create user-friendly meta edit-fields on edit-forms. The value assigned to the pblabel will appear above the edit-fields created by the <publish-meta> tag.

pblabel_xxx: The pblabel_xxx attribute allows you to add labels for each edit-field generated by an editable attribute. These labels can help clarify the expected input or offer brief instructions to people entering information in the edit-form. The _xxx is just a placeholder for the name of the attribute that you would like to create a label for. Labels generated with pblabel_xxx attributes will appear to the right of the edit-fields on the edit-form. If the pblabel_xxx attribute is omitted, a default label will be generated based on the HTML attribute name.

pbcontrol: The pbcontrol attribute specifies that the <publish-text> tag should draw its content from a pull-down menu created with a <publish-form-control> tag. You must have or include a <publish-form-control> on your template to use this attribute.

name: The name attribute is the same as its HTML counterpart. The name identifies the type of meta tag you are creating (eg: description, keywords, target).

content: The content attribute corresponds to its HTML counterpart. The value of the content attribute will appear as the value of the content attribute of the HTML meta-tag. Any value preceded by a (*) will be editable.

other: The value of any other attributes preceded by a (*) will be editable.

<publish-rewrite> . . . </publish-rewrite>

This tag specifies that Atomz Publish rewrite relative URLs to be absolute. All relative URLs (except for anchor links that reference named anchors on the same page) that are nested in a <publish-rewrite> tag will be rewritten when pages are previewed, edited and published in your account. While editing, links will be treated as if they were external URLs, and pages will open without the Design Manager button bar.

Attributes of <publish-rewrite> tags: pbbase pbbase: The pbbase attribute is optional. It specifies a base address that is prefixed to all relative URL references (except for anchor links that reference named anchors on the same page, <a href="#top">) nested inside the <publish-rewrite> tag. If the pbbase attribute is omitted, the Site Base will be used. Example of pbbase: "http://www.mysite.com/press/".

<publish-text> . . . </publish-text>

The <publish-text> tag is used to create edit-fields for nonspecific text. Any text and HTML that appears between the open and close <publish-text> tag will be used as default content. Either the pbname or pbsource attribute is mandatory.

Attributes of <publish-text> tags: pbname, pbsource, pbrows, pbcols, pblabel, pbeditmarker, pbeditmarkerdirection, pbhide, pbtexteditor, pballowhtml, pbcontrol, wrap pbname: The pbname attribute is mandatory if the content of the <publish-text> tag is editable. The value of the pbname attribute must be a unique name.

pbsource: The value of this attribute must be set to the value of a pbname that belongs to another <publish-text> tag on the template.

pbrows: This optional attribute gives the template designer control over the appearance of the text edit-field on the edit-form. When the value of pbrows is set to 1, the input will be a single line. Any other value will create a corresponding long multiple line text edit-field. If the pbrows attribute is not set, it will be assigned a default value of 5.

pbcols: The pbcols attribute works much like the pbrows attribute, only it affects the width of the text edit-field instead of the height. The default value of this attribute is 60.

pblabel: pblabel attributes help create user-friendly text edit-fields on edit-forms. The value assigned to the pblabel will appear above the edit-form input.

pbeditmarker: This optional attribute determines whether the orange edit-marker will appear beside the edit-field in the Edit-Marker mode or not. If pbeditmarker is omitted, the value will default to yes and the edit-marker will appear. If the value of pbeditmarker is set to no, the edit-marker will not display.

pbeditmarkerdirection: This attribute control which way the arrow in the orange edit-markers points. It can take four possible values: left, right, up or down. If the attribute is omitted, the value defaults to right.

pbhide: This attribute hides the output of an editable Atomz Publish template tag. publish-text tags which have a pbhide attribute set to yes will allow users to edit the content of the publish-text tag, but that content will not be passed to the pages created with that template. The default value of pbhide is no.

pbtexteditor: This attribute specifies how text is edited in template edit-forms. If the attribute is omitted, the value will default to the account setting. (If a value has not been set for the account, a default setting of mapeol is used throughout the site.) The pbtexteditor attribute is ignored for single-line text edit-fields. The attribute can have one of three values: mapeol, raw, or rich.

pballowhtml: This attribute controls which HTML tags are allowed in the text edit-field. If pballowhtml is not specified then the default setting (set with the option in the Design area) for the account is used. (If a value has not been set for the account, a default setting of ask is used throughout the site.) The pballowhtml attribute can have one of three values: any, basic, or ask.

pbcontrol: The pbcontrol attribute specifies that the <publish-text> tag should draw its content from a pull-down menu created with a <publish-form-control> tag. You must have or include a <publish-form-control> on your template to use this attribute.

wrap: The wrap attribute is passed through to the HTML <textarea> tag on the edit-form for this field. The wrap attribute controls how the <textarea> edit control wraps text, and how line breaks are returned to the server when the form is submitted. The default value is soft. It can be set to: soft, hard, off <publish-title> . . . </publish-title>

The <publish-title> tag maps to the HTML <title> tag. The <publish-title> tag is assigned the pbname: _title.

Attributes of <publish-title> tags: pbcols, pblabel, pbcontrol pbcols: The width of the text edit-field created on the edit-form. The default is 60.

pblabel: pblabel attributes help create user-friendly title edit-fields on edit-forms. The value assigned to the pblabel will appear above the edit-form input.

pbcontrol: The pbcontrol attribute specifies that the <publish-text> tag should draw its content from a pull-down menu created with a <publish-form-control> tag. You must have or include a <publish-form-control> on your template to use this attribute.

We claim:

1. A computer implemented method of generating a document, comprising:

receiving a request to provide a document, the document comprising a template and content;

retrieving a document template and a document content, the document template or the document content including an indirect address;

determining a context of the document, wherein the document is a web page and the context comprises a template preview, a page preview, a local publish or an external publish;

determining an indirect address type of the indirect address, wherein the indirect address is a uniform resource locator and the type comprises a site relative uniform resource locator, a template relative uniform resource locator, a page relative uniform resource locator, a system relative uniform resource locator, or a same page link uniform resource locator;

obtaining a site base for the requested document, the site base comprising a first portion of an absolute uniform resource locator;

combining the site base and the indirect address to form an absolute address by modifying the indirect address based on the context of the document and the indirect address type of the indirect address; and combining the template, the content, and the absolute address to create the document.

2. The method of claim 1, further comprising identifying a second indirect address in the template or the document content and modifying the second indirect address to be a page relative uniform resource locator.

3. The method of claim 1, further comprising identifying a third indirect address in the template or the document content and modifying the third indirect address to remove a marking symbol from the indirect address.

4. The method of claim 1, further comprising identifying a fourth indirect address in the template or the document content and modifying the fourth indirect address to be a page relative uniform resource locator.

* * * * *